United States Patent [19]

Sargent et al.

[11] Patent Number: 4,944,048
[45] Date of Patent: Jul. 31, 1990

[54] SELF-CONTAINED RV SANITARY SYSTEM

[75] Inventors: Charles L. Sargent; John M. Antos, both of Ann Arbor, Mich.

[73] Assignee: Thetford Corporation, Ann Arbor, Mich.

[21] Appl. No.: 427,030

[22] Filed: Oct. 25, 1989

Related U.S. Application Data

[60] Continuation of Ser. No. 180,321, Apr. 11, 1988, abandoned, which is a division of Ser. No. 870,800, Jun. 5, 1986, Pat. No. 4,776,631.

[51] Int. Cl.$^5$ ............................................... E03D 1/00
[52] U.S. Cl. .......................................................... 4/323
[58] Field of Search .................................... 4/321–323, 4/460

[56] References Cited

U.S. PATENT DOCUMENTS

| | | | |
|---|---|---|---|
| 957,933 | 5/1910 | Clarke | 4/323 |
| 1,021,663 | 3/1912 | Cronk | 4/321 |
| 3,858,249 | 1/1975 | Howard | 4/232 X |
| 4,145,773 | 3/1979 | Sargent et al. | 4/321 |
| 4,217,668 | 8/1980 | Sargent et al. | 4/323 X |
| 4,641,680 | 2/1987 | Been | 4/321 X |

FOREIGN PATENT DOCUMENTS 83645A 1/1981 Italy .......................................... 4/321

Primary Examiner—Charles E. Phillips
Attorney, Agent, or Firm—Harness, Dickey & Pierce

[57] ABSTRACT

A self-contained sanitary fixture, particularly for a recreational vehicle, comprises a bench supported on a base cooperatively defining a stowage compartment. The bench contains a bowl having an outlet which connects to a tank in the stowage compartment. A valve on the tank controls passage between the bowl and the tank. The valve is itself operated from a knob on the bench through a coupling mechanism. Waste water from the bowl is collected in the tank and is disposed of by sliding the tank out of the stowage compartment through an opening in the RV's sidewall and carrying the tank to a suitable disposal site. The tank incorporates a rotatable pourspout and vent valve to facilitate pouring waste contents out of the tank. The connections between the bowl outlet and the tank and between the knob and valve automatically disconnect upon removal of the tank from the stowage compartment. Similarly they automatically reconnect when the tank is inserted back into the stowage compartment. There are numerous features to the invention including those in the fixture and its various parts and in relationships to the installation in the recreational vehicle.

38 Claims, 26 Drawing Sheets

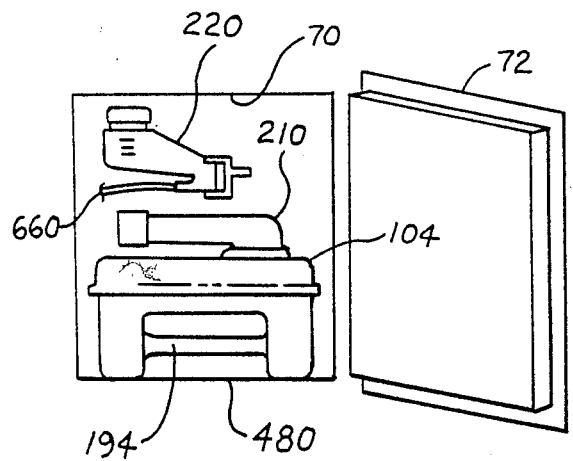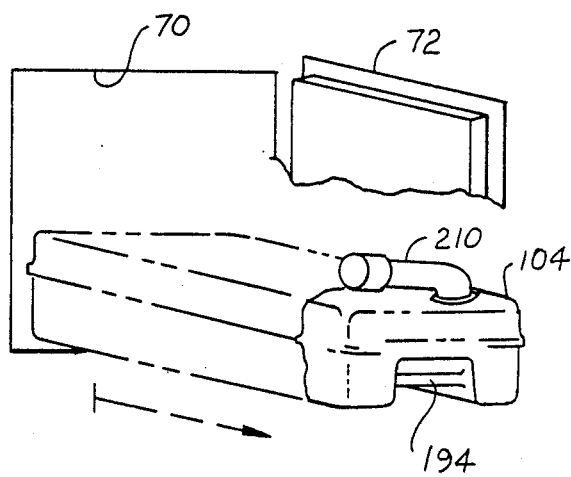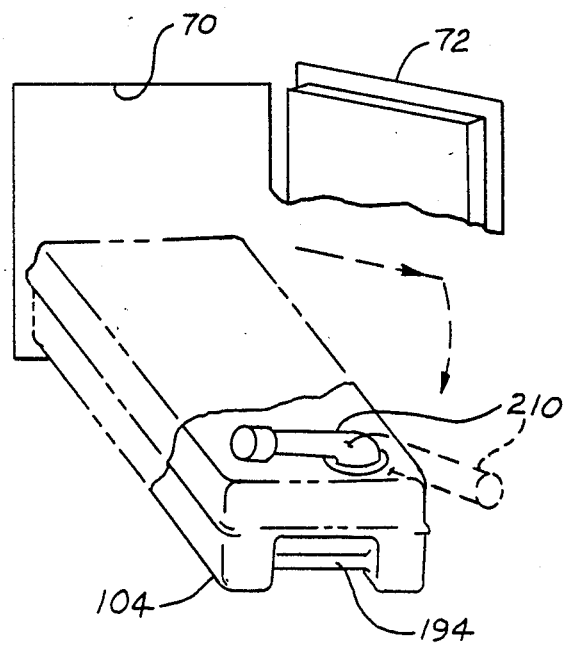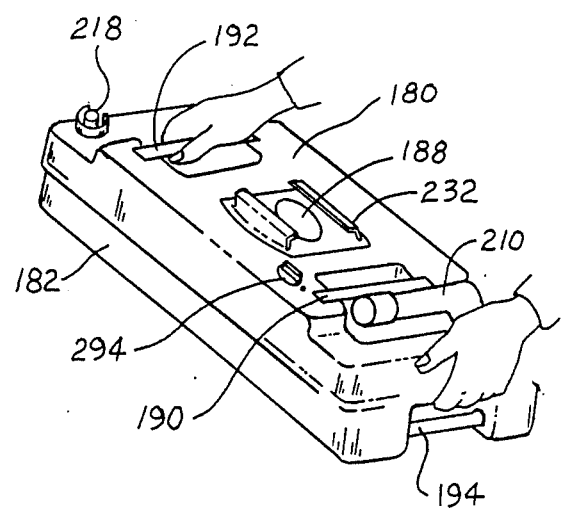

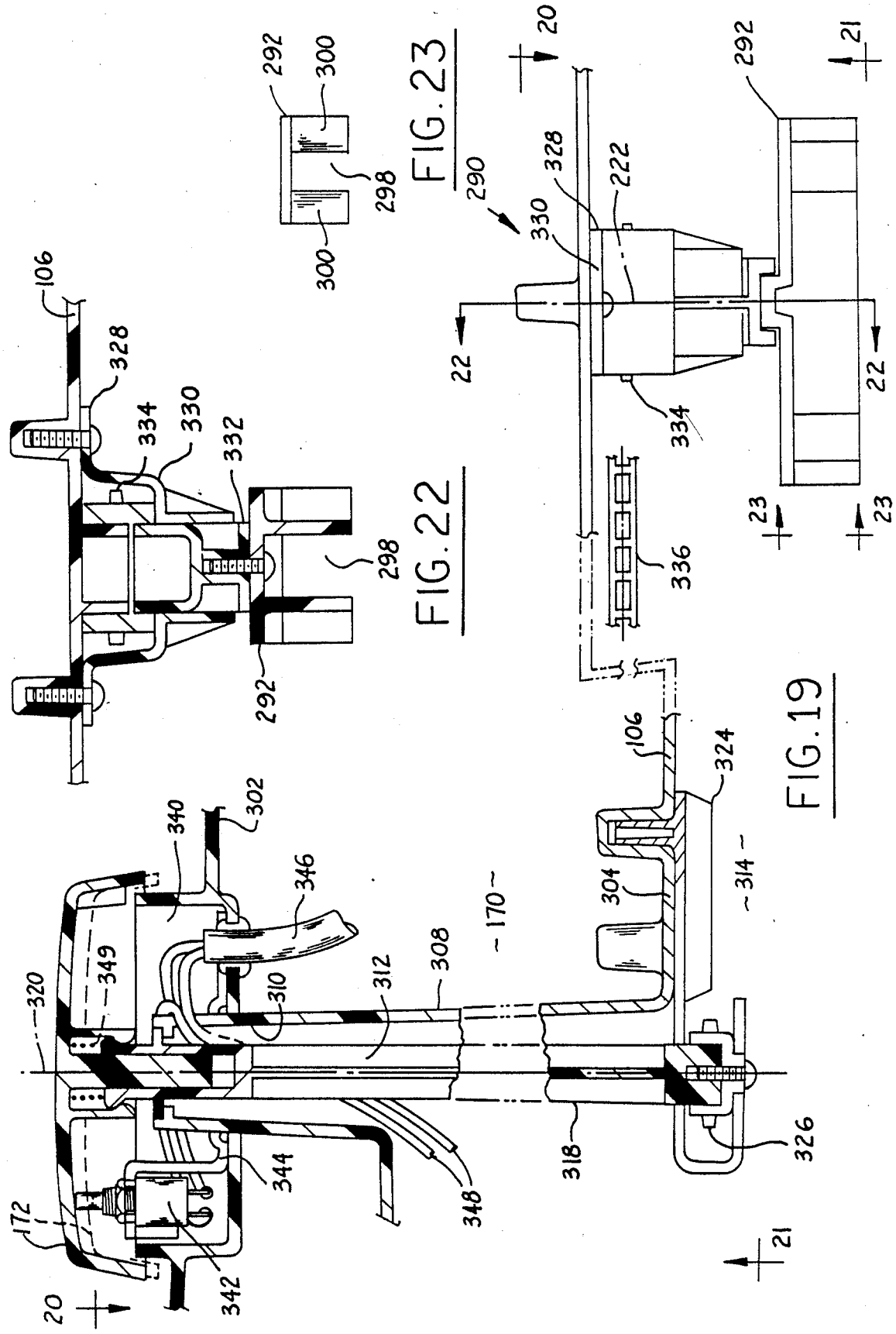

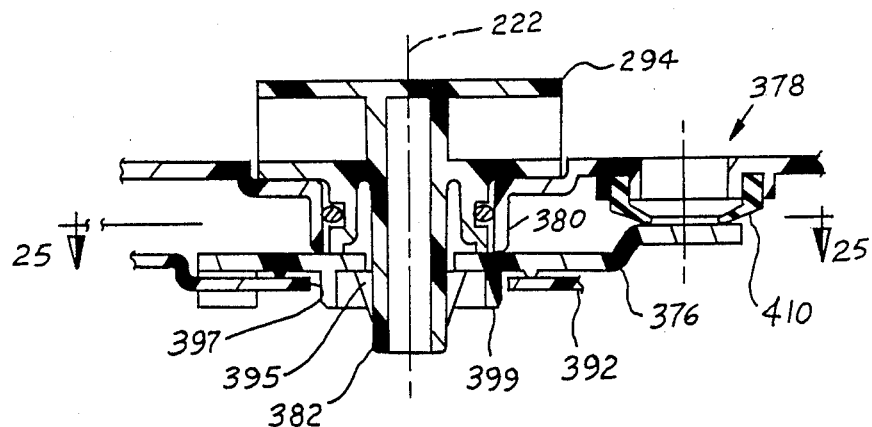
FIG. 24
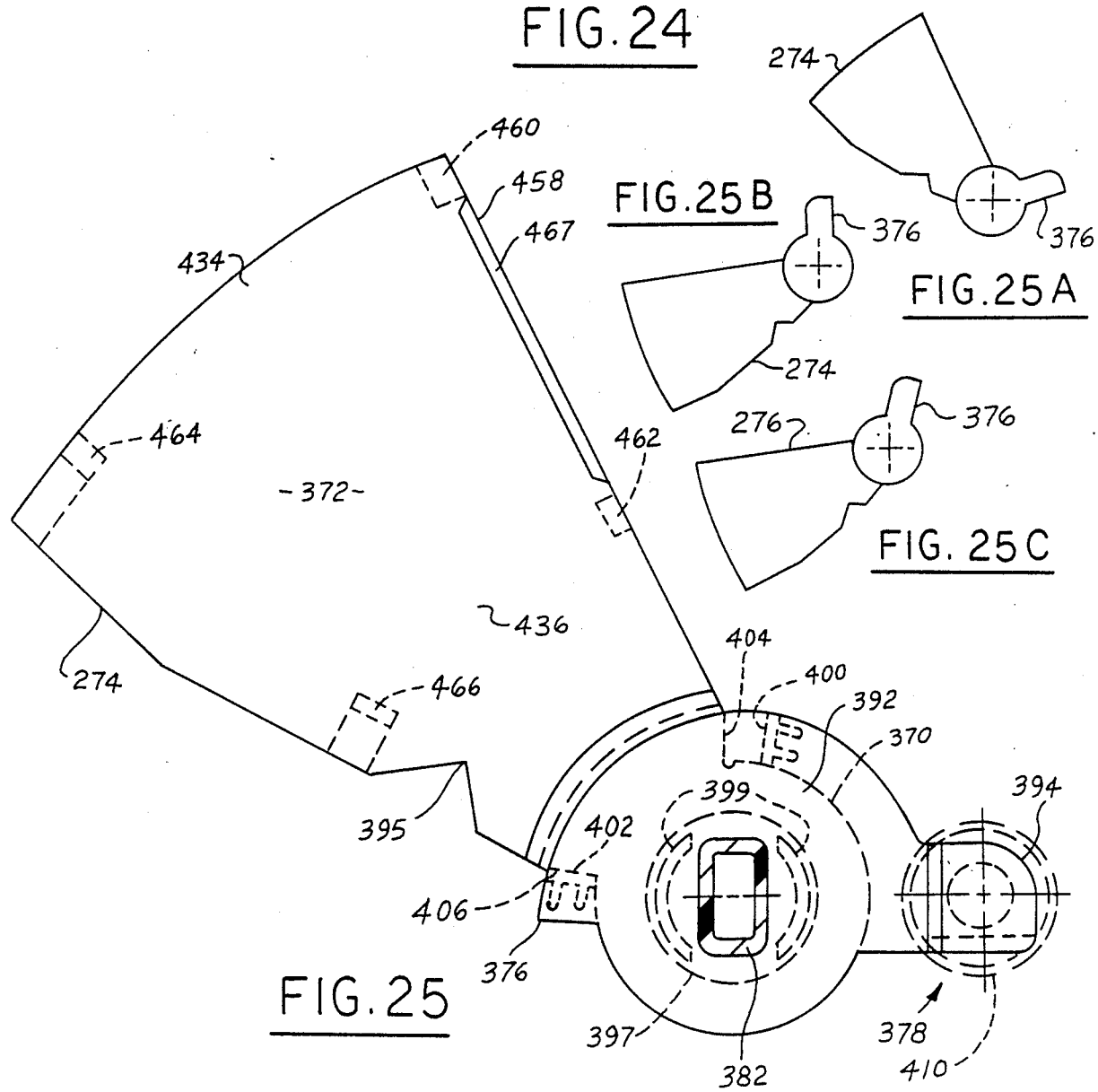
FIG. 25B
FIG. 25A
FIG. 25C
FIG. 25

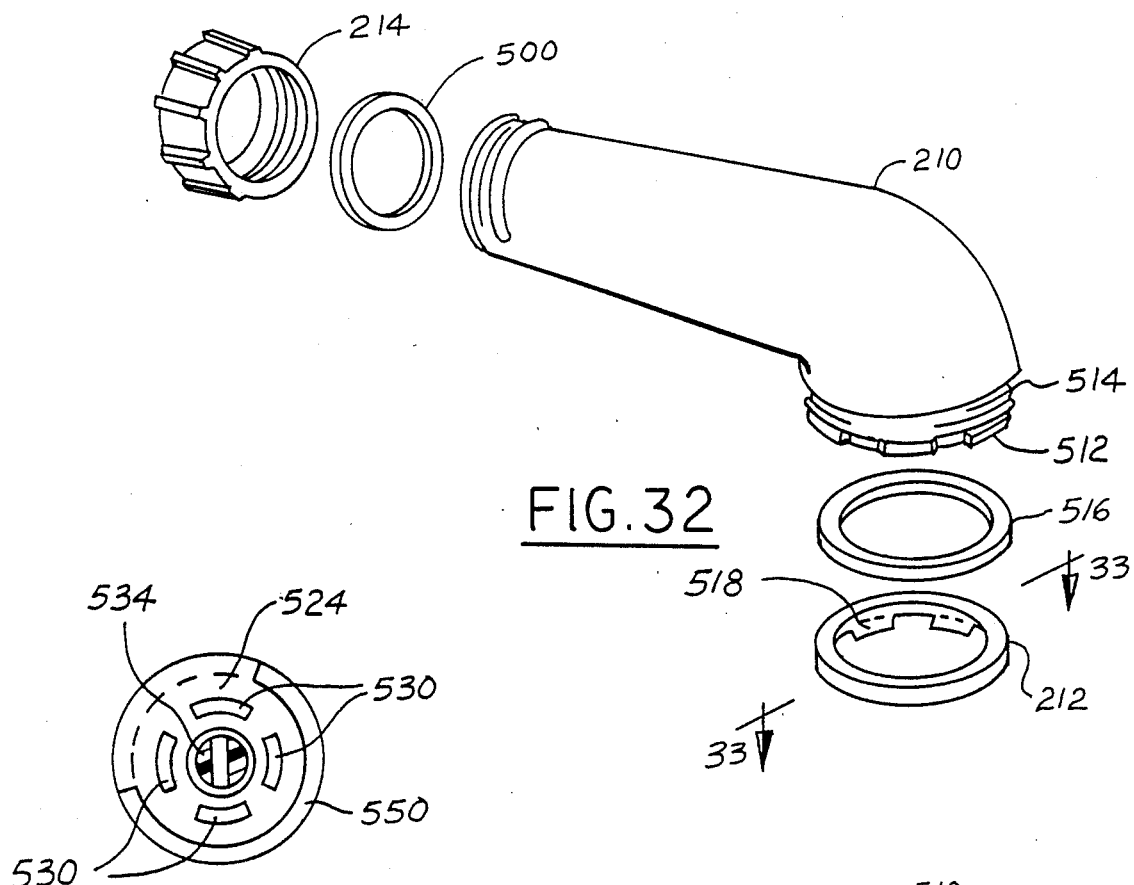
FIG. 32
FIG. 33
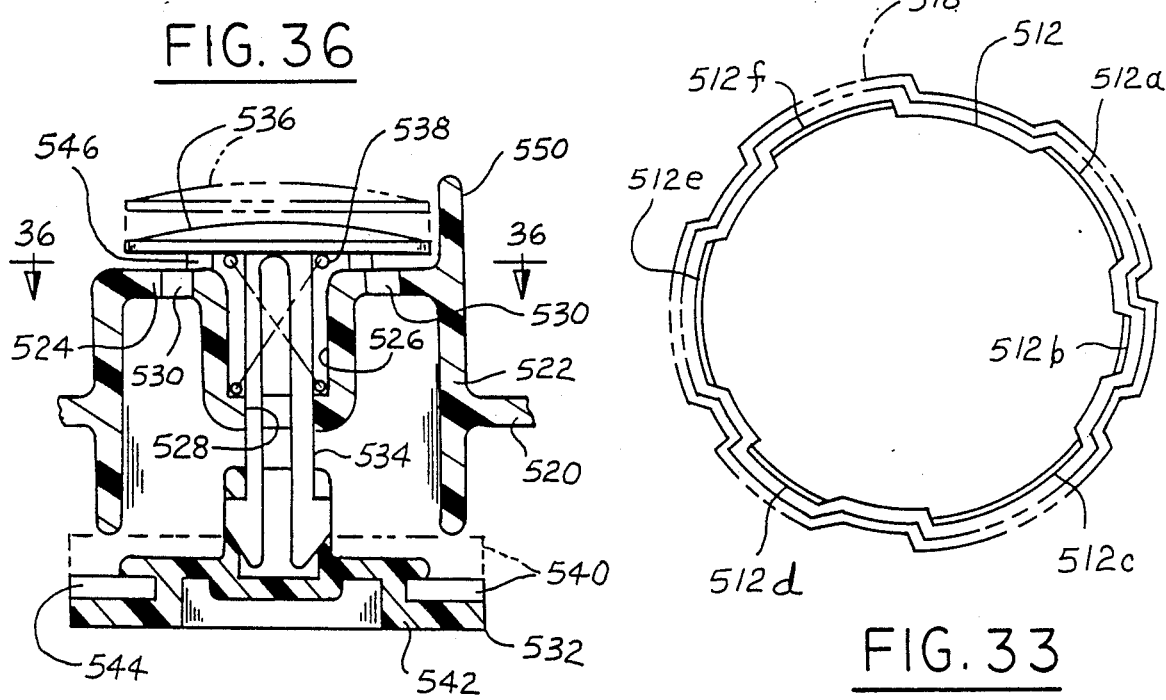
FIG. 36
FIG. 35

SELF-CONTAINED RV SANITARY SYSTEM

This is a continuation of U.S. patent application Ser. No. 07/180,321, filed Mar. 11, 1988 now abandoned which is a division of U.S. patent application Ser. No. 870,800, filed June 5, 1986 now U.S. Pat. No. 4,776,631.

BACKGROUND AND SUMMARY OF THE INVENTION

This invention relates to recreational vehicles such as motor homes and travel trailers, and is particularly concerned with new and unique installations for the tanks which are parts of the water use systems of such vehicles.

The typical recreational vehicle (RV) comprises a wheeled chassis on which a body is mounted. The body contains an interior space for use by occupants. RV's have come to enjoy increasing popularity over the years because of the many conveniences which they provide. Today many RV's are entirely self-contained which means that they have not only their own living accommodations but all related conveniences as well. One of the conveniences is a complete self-contained water use system including sanitary fixtures such as sinks, showers, baths, toilets and the like. Fresh water for the system is contained in one or more fresh water storage tanks; waste liquid is stored in one or more holding tanks. Typically there are separate waste holding tanks for what is commonly respectively referred to as "gray water" and "black water." Gray water is waste water from sinks and showers whereas black water is waste from toilets.

In self-contained RV's in the United States, it has heretofore been the practice to locate the fresh water storage tank inside the vehicle body where it is within the interior occupant space. Such tanks usually have generally rectangular shapes and are mounted on the body floor, for example, concealed beneath a bench or a cabinet.

Waste water tanks are typically exterior of the RV body, usually being suspended from the chassis below the body floor. Because of this, they often reduce the RV's road clearance in the area of the chassis where they are located. They must be sufficiently strong to withstand damage from external forces such as rocks and stones for example.

The waste tanks have inlets which are in communication with outlets of the respective sanitary fixtures which they serve. Each waste tank has an outlet controlled by a gate valve. These gate valves usually connect to a common outlet to which a hose is attached for dumping. When the valves are opened, the tanks' contents drain through the hose. Because dumping of waste onto open ground is usually prohibited, the tanks are dumped either into an intermediate container which is then carried to the disposal site, or else by moving the RV to the disposal site. The valves and the related conduits are also exterior of the RV and hence subject to potential damage from external forces.

In general, neither fresh water tanks nor waste holding tanks are intended for removal. Since typical waste holding tanks are disposed beneath the RV, they are removable only for service, and if at all, only by access to the undercarriage of the RV to separate the means of attachment, allowing them to be dropped down for removal. Tanks on the RV's interior, be they fresh water or waste water, first require removal of some interior part or parts of the body, such as a bench or cabinet, before they themselves can be removed.

Sometimes the toilet facility of an RV comprises simply a portable toilet situated in a particular location of the recreational vehicle. A typical portable toilet is a two-piece, fresh water flush type comprising a seat section which is supported on and separably attached to a holding tank section. Such a toilet is serviced usually by carrying it out of the RV either in its entirety, or else, depending upon the nature of particular service needed, i.e. either filling with fresh water or disposal of water, by separating the two sections and carrying only the one needing service out of the RV. In smaller RV's, servicing through the inside occupant space of the RV may be considered by some to be undesirable, or even offensive, for example where the portable toilet is carried through the eating area of the RV.

The present invention relates to improvements in the self-contained water use systems, such as are commonly found in RV's, and important objectives of the invention are to promote user convenience, to eliminate the need to service the systems through the interior occupant space of the RV, and to package the system in a highly space efficient manner while nonetheless endowing the system with numerous user conveniences. While certain aspects of the invention bear a direct nexus to an RV, it is to be appreciated that certain aspects of the invention have potential usage in other than the specific context of an RV installation.

In the context of an RV installation, certain significant aspects of the invention relate to the waste disposal tanks which receive and collect waste from sanitary fixtures in the RV. Other aspects relate to fresh water storage chambers inside the RV.

For application of the invention in an RV waste holding tank, the preferred embodiment of the invention contemplates a stowage compartment within the RV body which is separated from the interior occupant space. The stowage compartment is disposed adjacent the body sidewall and an access opening to the stowage compartment is provided in the sidewall. The access opening is closed by a door. When the door is opened, the holding tank can be moved bodily outwardly of the stowage compartment through the access opening and carried to a waste disposal site at which the accumulated contents are poured out of the holding tank. Afterwards the tank may be rinsed and provided with an initial fill of a small amount of water and possibly one or more chemicals commonly used with such holding tanks for various purposes such as odor control for example. The tank is then inserted through the access opening back into the stowage compartment, and the access door is closed.

Still in this context of an RV waste holding tank installation, the preferred embodiment of the invention comprises a means for automatically making a sealed connection of the holding tank to an outlet from a sanitary fixture inside the RV which is served by the holding tank when the tank is inserted into the stowage compartment and stowed. Specifically, this automatic connection is made in accompaniment of the act of inserting the holding tank into the stowage compartment so that there is no need to perform any additional manipulation or operation in order to make the sealed connection, other than the mere act of inserting the holding tank into the stowage compartment. While details of how this is accomplished will be explained in the ensuing description of the preferred embodiment, it may be briefly stated that the holding tank is supported on a base in the stowage compartment and the base serves to guide the holding tank motion into the stowage compartment. The base bears a predetermined relationship to the outlet from the sanitary fixture to which the holding tank is to be connected so that the holding tank opening which connects to the outlet will be brought into registry with the outlet when the tank is fully stowed. In addition, a guide on the holding tank at the holding tank opening and a mating flange on the outlet from the sanitary fixture serve to provide precise control of the registry insuring a sealed connection despite tolerance variations in the degree of precision of tank guidance provided by the base.

When the holding tank is intended to be a black water tank which collects waste from a toilet, the valve for controlling the passage of waste from the toilet bowl is provided on the holding tank to open and close the holding tank opening which is in registry with the toilet bowl outlet. Because the operator for the valve is located inside the occupant space adjacent the toilet bowl, an operative connection from the operator to the holding tank valve must be provided. This operative connection includes a disconnectable connection which connects and disconnects in accompaniment of the connection and disconnection of the holding tank opening to and from the toilet bowl outlet so that no further manipulation or operation is required for connection or disconnection. In other words the connection and disconnection are entirely automatic, occuring in accompaniment of the motion of the tank into and out of the stowage compartment. The preferred embodiment of this connection is such however that removal of the holding tank from the stowage compartment cannot occur unless the operator has been operated to a position which closes the holding tank valve. In this way the holding tank opening will be closed when the holding tank is removed from the stowage compartment. If the operator is moved from this position while the holding tank is out, a successful reconnection can still occur by providing lead which will automatically re-align the connection as the tank is reinserted. Convenience in removing, installing, and dumping the contents of the holding tank is promoted by providing multiple handles on the holding tank. One handle is at the one end of the holding tank's sidewall which confronts the access opening in the RV sidewall. A second handle is located in the top wall of the holding tank between the first handle and the valved opening into the holding tank which is centrally located on the holding tank's top wall.

In order to remove the holding tank from its fully stowed position, a spring-loaded catch must be released after the access door has been opened. This catch is located on the base which supports and guides the holding tank and is in an interference relationship with the lower edge of the end of the tank's sidewall which confronts the access opening in the RV's sidewall. In the interference position the catch serves to constrain the holding tank against withdrawal from the fully stowed position.

When the holdng tank is to be withdrawn, the catch is depressed, and the first handle in the end of the tank sidewall is grasped to begin withdrawing the tank from the stowage compartment. The bottom wall of the tank rides over the depressed catch as withdrawal of the tank continues. The bottom wall of the tank is configured with a clearance which passes over the catch allowing the catch to return to its interference position. After a predetermined amount of withdrawal of the tank, a stop in the bottom wall of the tank at the end of the clearance will abut the catch. By having this occur before the tank has been fully withdrawn, the catch serves to prevent the tank from being accidentally pulled completely out of the stowage compartment and possibly dropped on the ground where damage might ensue.

The tank also has a third and fourth handle on the side of its valved opening opposite the side containing the first two handles. The third handle is in the top wall, and the fourth is in the far end sidewall. Once the motion of the tank has been arrested after it has been withdrawn this predetermined amount, the third handle can be grasped by the person's other hand. The tank can now be tipped downwardly at the near end and slightly upwardly at the far end to thereby clear the bottom wall from the catch and allow the tank to be removed entirely from the stowage compartment. This takes place after the tank's opening has moved a sufficient distance from the outlet of the sanitary fixture so that such tipping can occur without interference between the opening and outlet, or the flange and guide which are respectively attached to the outlet and the opening.

In the preferred embodiment of the invention the holding tank is generally symmetrical about a vertical plane which bisects the valved opening to the tank. One aspect of this symmetry is that the third handle which was just referred to is symmetrical to the second handle and the fourth handle is symmetrical to the first handle.

A pourspout is rotatably mounted in a hole at one corner of the top wall of the holding tank. The pourspout is rotatable about an axis perpendicular to the top wall between a stowed position and a pouring position. In its stowed position, the pourspout overlies the top wall of the holding tank generally parallel with and immediately adjacent the top edge of the near end of the tank's sidewall which confronts the access opening in the RV's sidewall when the tank itself is in fully stowed position. In its pouring position, the pourspout projects outwardly beyond the sidewall, pointing away from the tank. When the tank has been removed from the stowage compartment and transported to a disposal site for dumping, the pourspout is operated to its pouring position and aimed into the disposal site. A closure cap on the end of the spout is removed before pouring.

In order to facilitate the flow of waste out of the tank through the pourspout, a manually operated vent valve is provided in the top wall of the holding tank at the far end, opposite the near end which contains the pourspout. This manually operated vent is disposed proximate the far end wall handle so that it can be operated by the person's thumb while that far end wall handle is being grasped by the fingers of the same hand, and the other hand grasps the top wall handle which is nearer the pourspout. By providing a separate vent valve, it is unnecessary to open the closed holding tank valve, and this serves to avoid any leakage which might occur through the holding tank opening if its valve had to be cracked open for venting.

The vent valve amounts in a fitting which is assembled into a hole in the top wall of the holding tank at the far end. This hole is arranged in the top wall in symmetry to the hole in which the pourspout is mounted. The manner in which the fitting attaches into its hole is like the manner in which the pourspout fits into its hole so that a pourspout can be fitted into either of the two holes and likewise a vent valve assembly can be fitted into either of the two holes.

This hole symmetry and the handle symmetry, in relation to the central location of the valved opening into the holding tank enables a common tank to be used for right hand and left hand system installations. This is advantageous because it means that separate tanks do not have to be tooled to accommodate these two types of installations and this reduces at least in half tooling cost which would otherwise possibly be required to accommodate both types of installations. It also is a convenience if a replacement tank or other replacement parts for the tank are ever needed. The possibility also exists for certain installations that a common base may be used, and in fact in the disclosed embodiment the same base will serve both right hand and left hand installations, and for such purpose it comprises releasable catches at both ends.

In the case of a self-contained toilet system, the toilet may be equipped with either a manual or an electrically operated pump for introducing flush water into the toilet bowl. In the electric pump version, the operator for opening and closing the holding tank valve is configured in a manner not only for conveniently operating the holding tank valve but also for operating the electric pump. In this regard the operator is in the form of a knob having a central axis about which the knob turns to open and close the holding tank valve and along which the knob moves axially to control operation of the electric pump.

The disclosed embodiment of toilet system, comprises a bench, or seat section, which is intended to be built into the RV in a permanent manner. The toilet bowl is located centrally in the bench and the bench has a fresh water storage chamber surrounding the bowl. The operator for opening and closing the holding tank valve is located on the top wall of the bench adjacent the bowl so as to be accessible for the operation by a standing or seated user. On the opposite side of the bench, the top wall contains a large hole. When the toilet is of the electrically operated pump type, the pump mechanism is installed within the interior of the chamber by passing it through this hole. The hole is then closed by a closure in the form of a receptacle which extends into the bench. This receptacle is of a circular cylindrical configuration and a size which allows a fresh roll of toilet paper to be stored in it. The receptacle is closed by a removable cover.

In the manually operated pump version, the pump, which is preferably a bellows type of the kind used by the assignee of this invention in its line of portable toilets, is mounted on a fitting which in turn is assembled in closure of this large hole.

Because the fresh water storage chamber of the bench must be periodically filled with a supply of fresh water, a further aspect of the invention relates to the filling of this chamber from the outside of the RV. In the disclosed embodiment this is accomplished through the same access opening in the RV's sidewall through which the holding tank is removed and installed. A fill is disposed behind the closed access door, but when that door is open, the fill can be swung outward for filling.

The fill is disposed at a vertical elevation correlated with the fill level within the water storage chamber. A conduit from the fill to the chamber is routed along a path, portions of which are below the full fill level of the chamber, and in fact the conduit connects to the chamber at a location below the full fill level. Hence the tank fills by the principle of water seeking its own level, and therefore as water is introduced into the fill the level of water at the fill will rise in accordance with the actual fill level within the chamber. The fill is provided with a sight gauge so that the person filling the chamber can see when the tank is full by observing the sight gauge.

The water storage chamber has a space-efficient configuration which would result in the formation of an air pocket during filling restricting the extent to which the chamber can be filled, but for another of the aspect of the invention. This aspect provides a vent for the chamber headspace to the interior of the toilet bowl. While the location and size of the vent are such that it will not pass water sloshing about in the chamber, any such activity which results in small amounts of water passing through the vent result in the water collecting in the toilet bowl.

Likewise it may be necessary at times to drain the fresh water chamber and this is done through a drain line which extends from a low point of the chamber through the stowage compartment to the RV's sidewall access opening. When the door to the sidewall access opening is open and the chamber is to be drained, the length of the drain conduit allows it to be extended to outside of the RV. A closure in the end of the drain conduit is removed allowing the contents of the tank to drain to outside the vehicle.

A further aspect of the fresh water storage chamber filling and draining is that the same parts can be used for both right hand and left hand installations.

Thus, in an RV installation the invention provides complete servicability from the RV's exterior. Chemicals are to be added to the holding tank from the exterior, and a convenient stowage place for the chemicals is provided within the stowage compartment by one or more pan formations in a part of the base which underlies the holding tank.

There are certain features in the base which are also advantageous. The disclosed embodiment of base comprises a load bearing framework on the RV's floor which provides the principal load support for both the bench and the holding tank. A molded plastic base member comprises a track structure which supports and guides the holding tank into and out of the stowage compartment with the track structure in turn being supported by the load bearing framework. The base member comprises an integral formation of the aforementioned pan or pans at a level below the holding tank. Not only can this pan formation serve to store containers of chemicals, but it can collect liquid which otherwise might fall onto and run along the RV floor. In the event that the toilet were used while the holding tank was removed, such pan or pans structure form a sump in which the waste material may collect, thereby preventing the waste material from spreading onto the vehicle floor.

The base also has a cooperative association with the RV floor in forming a service conduit passage for various service conduits running along the RV's floor, for example a heat duct which is required to pass through the location of the sanitary fixture.

The preferred embodiment comprises a level indicator on the holding tank to indicate the extent to which the holding tank is filled with waste. This level indicator is viewable through a window in the bench when the holding tank is in stowed position.

If there is a lack of attention to the level indicator such that the tank becomes overfilled, the level of waste will be above that of the holding tank valve blade. The pourspout bears a predetermined relationship to the holding tank valve blade which is especially useful in these situations where the tank is filled beyond its capacity.

The pourspout defines a weir level which is below that of the holding tank valve blade. If the tank is filled beyond its capacity the waste level will rise above the level of the valve blade. The existence of this situation may be perceived from the inside of the RV by viewing of the bowl; in other words the bowl will not drain into the holding tank because the holding tank is full. If an attempt is made now to remove the stowage tank, there will be waste material above the level of the closed blade which will be released when the tank is removed. Such a situation can be alleviated by rotating the pourspout from its stowed position to pouring position pointing through the access opening in the RV sidewall so that the outlet end of the pourspout is outside the RV. If the pourspout is now uncapped, the weir level defined by the pourspout will cause waste which is above the weir level to flow out through the pourspout and onto the ground, or into a container placed at the pourspout outlet. Hence the excess waste is relieved so that when the stowage tank is then removed there is no substantial waste above the level of the closed valve blade, and the cap can be placed back onto the pourspout outlet. The tank is removed in the manner previously described. In the event that there is any residual waste in the bowl outlet after the tank has been removed, it will drip into the base and any significant amounts will collect in the pans. This collected drippage can then be cleaned up.

In the order to provide the capability of a separable holding tank and a fixed bench installation wherein a valve on the holding tank must be controlled from the bench, further aspects of the invention relate to the valve mechanism itself and the manner in which the valve mechanism is operably coupled to the actuator, as alluded to earlier in the mention of the disconnectable connection in the coupling mechanism from the operator to the valve.

The foregoing features, advantages, and benefits of the invention, in its various aspects, along with additional ones, will be seen in the ensuing description and claims which should be considered in conjunction with the accompanying drawings.

BRIEF DESCRIPTION OF THE DRAWINGS

FIGS. 6, 7, 8, and 9 are fragmentary perspective views portraying a sequence of removal of the system's tank from the RV.

FIG. 19 is an enlarged fragmentary vertical sectional view taken generally in the direction of arrows 19—19 in FIG. 3 and having portions broken away.

FIG. 22 is a fragmentary vertical sectional view taken in the direction of arrows 22—22 in FIG. 19.

FIG. 23 is a fragmentary view looking in the direction of arrows 23—23 in FIG. 19.

FIG. 24 is a fragmentary vertical sectional view on an enlarged scale taken in the direction of arrows 24—24 in FIG. 3.

FIG. 25 is a fragmentary horizontal sectional view in the direction of arrows 25—25 in FIG. 24.

FIGS. 25A, 25B, and 25C are respective diagrammatic views illustrating different operative positions for the mechanism shown in FIG. 25.

FIG. 32 is a fragmentary exploded perspective view illustrating relationship of certain component parts.

FIG. 33 is a horizontal plan view taken generally in the direction of arrows 33—33 of FIG. 32.

FIG. 35 is an enlarged vertical sectional view taken in the direction of arrows 35—35 in FIG. 3.

FIG. 36 is a horizontal sectional view taken generally in the direction of arrows 36—36 in FIG. 35.

DESCRIPTION OF THE PREFERRED EMBODIMENT

Figure 1:
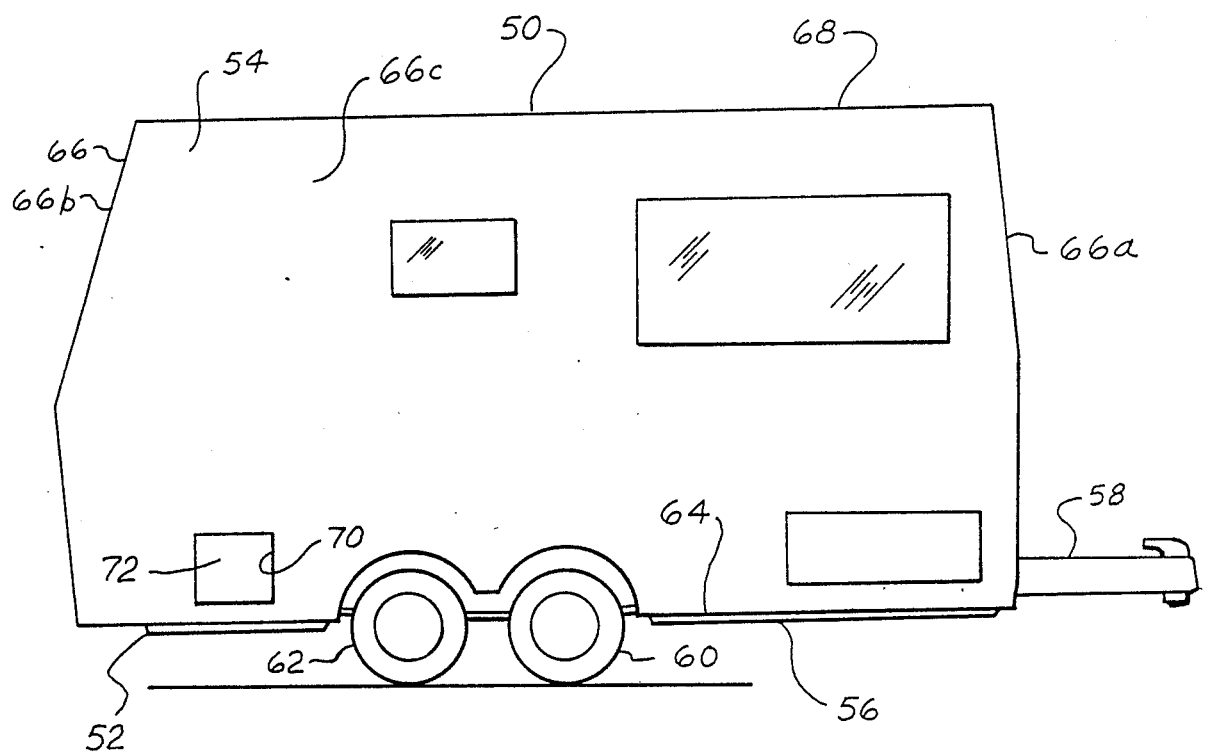
FIG. 1 is a side elevational view of a representative recreational vehicle (RV) having a self-contained sanitary system embodying principles of the invention.

FIG. 1 illustrates a representative recreational vehicle (RV) 50 which embodies a self-contained water use sanitary system according to principles of the invention. RV 50 is illustrated as a travel trailer which is adapted to be pulled behind a towing vehicle (not shown). Principles of the invention are applicable to other types of RVs including without limitation motor homes.

RV 50 comprises a wheeled chassis 52 on which is supported the RV body 54. Chassis 52 comprises a perimeter frame 56 having a tongue 58 at the forward end via which the trailer connects to the towing vehicle. The chassis further comprises tandem axles 60 and 62 which are supported from frame 56 by a suitable suspension system which may include leaf springs and shock absorbers.

Body 54, in general, comprises a floor 64, a vertical side 66, and a roof 68 forming an enclosure. The body is shown to be generally rectangular in shape although it is to be appreciated that any given body may have departures from such a shape. Side 66 comprises four sidewalls, namely a front 66a, a rear 66b, and two lateral sidewalls 66c. It is the right-hand one of these lateral sidewalls 66c which is viewed directly in FIG. 1, and it is arranged at a right angle to floor 64. Sidewall 66c is provided with a rectangular opening 70 which is shown in FIG. 1 to be closed by a door 72. This opening provides external access to the sanitary system within the RV body.

Figure 2:
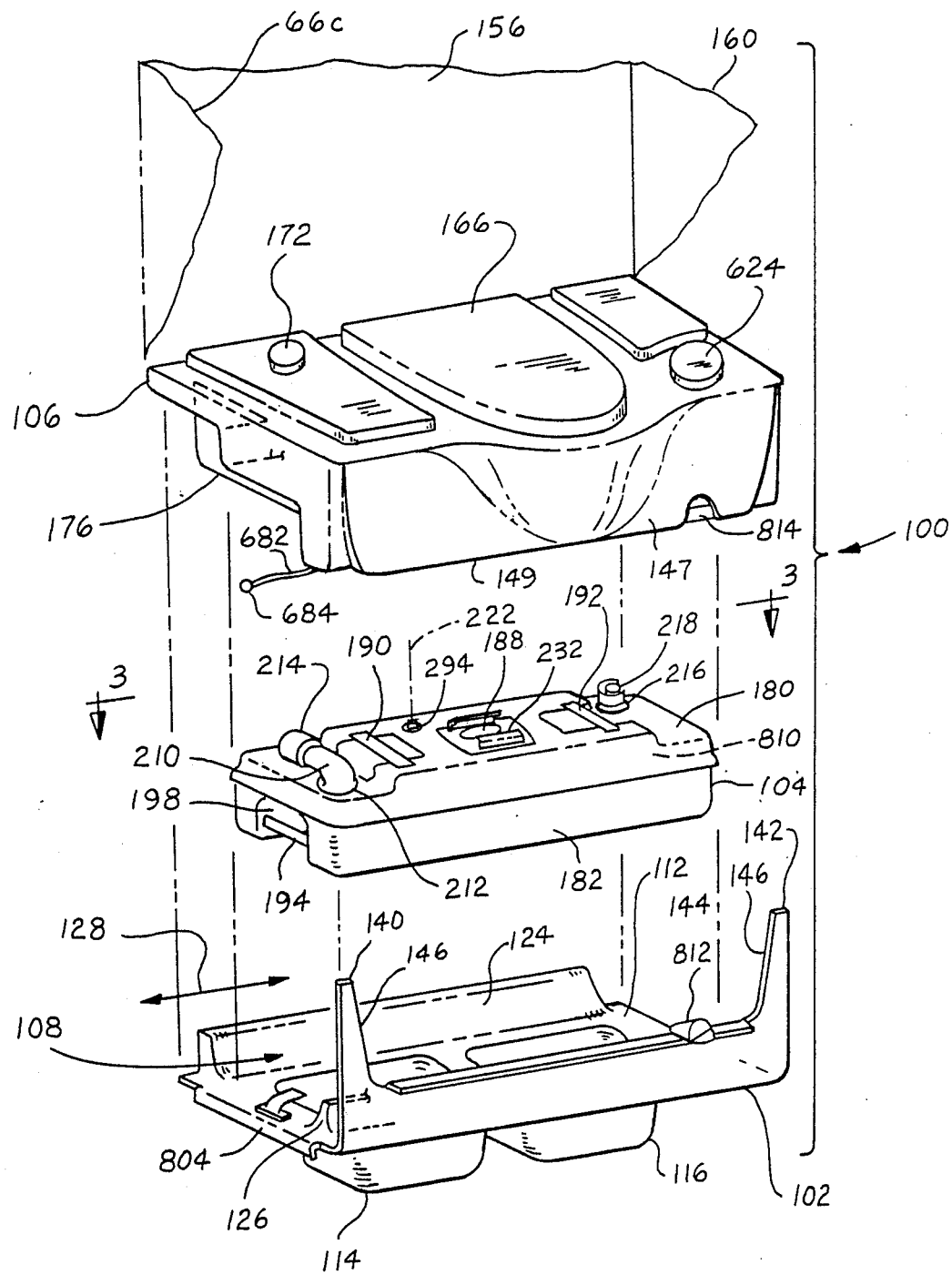
FIG. 2 is an exploded perspective view of three of the major components of the self-contained sanitary system, with portions of the RV broken away for illustrative purposes.
Figure 3:
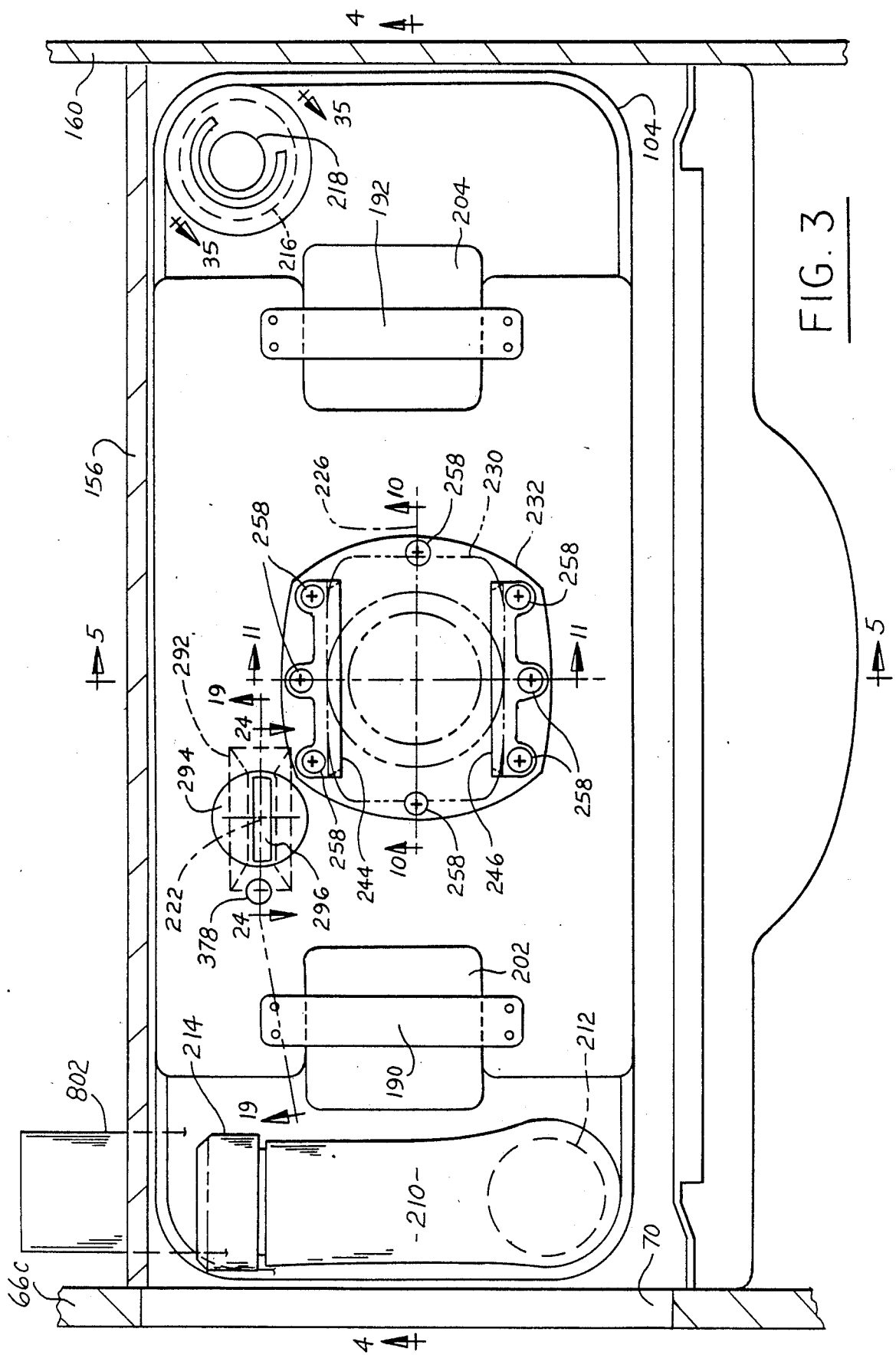
FIG. 3 is a top horizontal plan view taken generally in the direction of arrows 3—3 in FIG. 2, showing the assembly relationship in the RV, but with certain portions being omitted for illustrative purposes.
Figure 4:
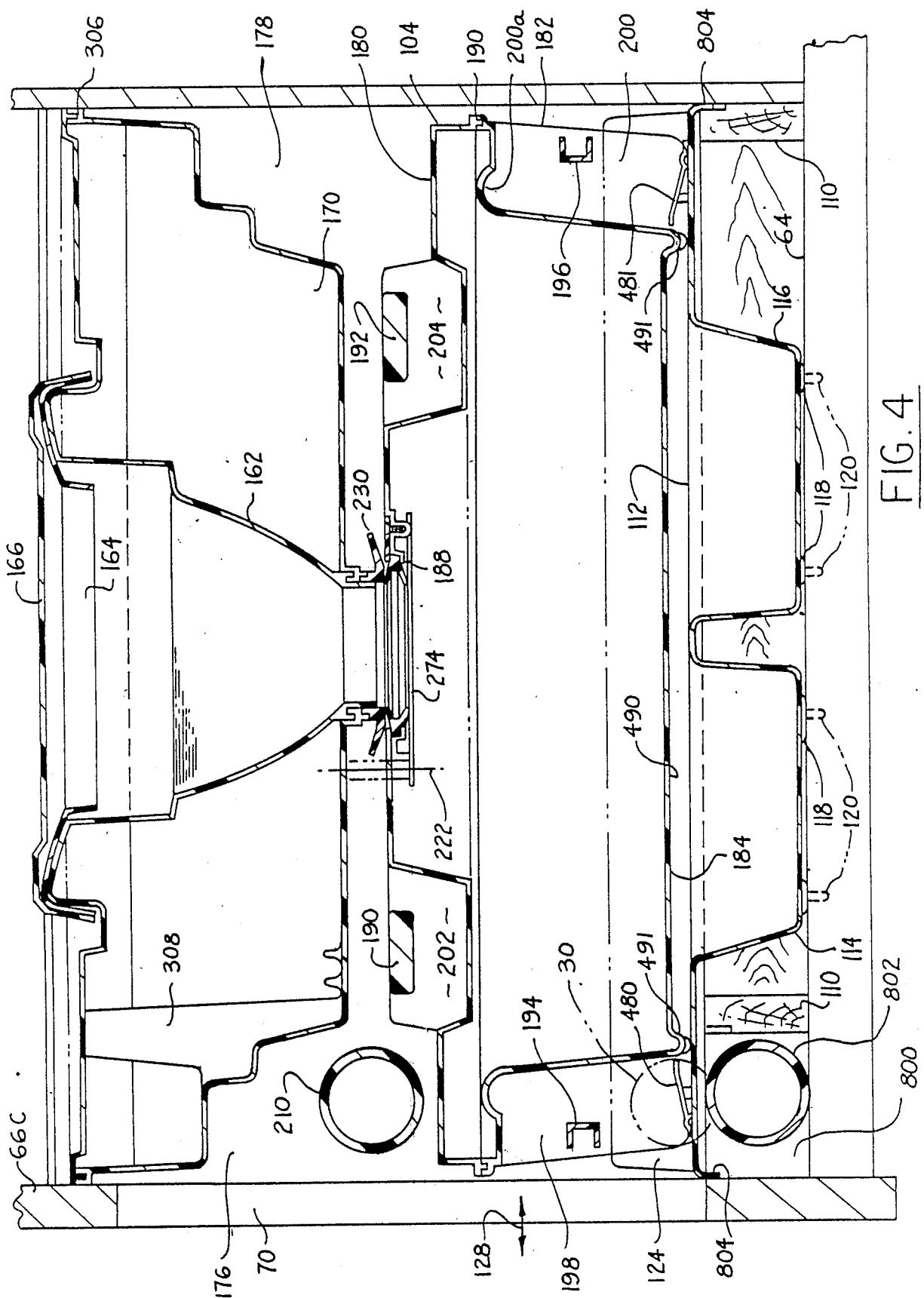
FIG. 4 is a vertical longitudinal sectional view taken generally in the direction of arrows 4—4 in FIG. 3.
Figure 5:
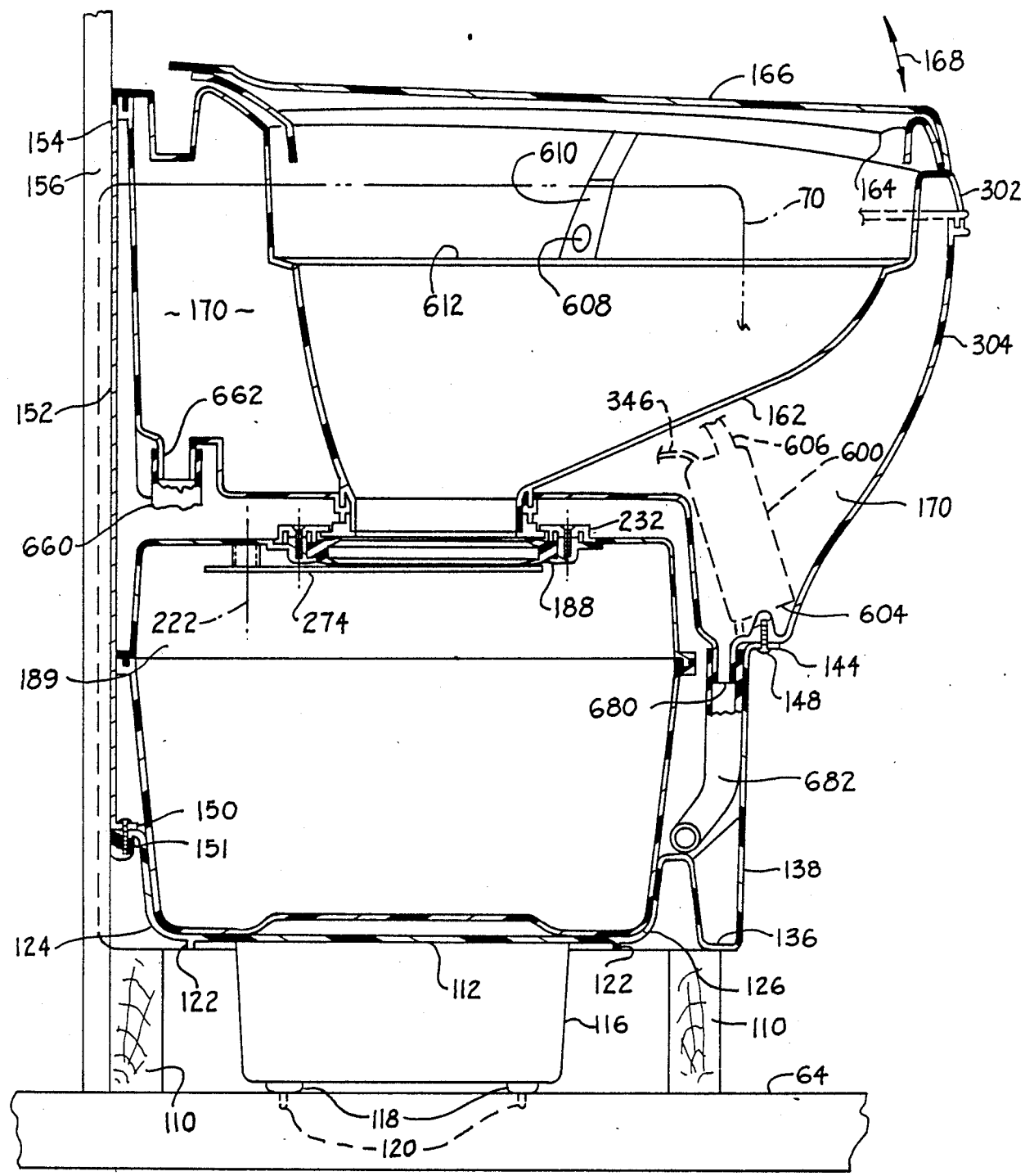
FIG. 5 is a vertical transverse sectional view taken generally in the direction of arrows 5—5 in FIG. 3.

FIGS. 2, 3, 4, and 5 portray the general organization and arrangement of a preferred embodiment of self-contained sanitary system according to principles of the invention. The illustrated embodiment is of a toilet system, 100 generally. FIG. 2 portrays three of the major components by themselves in an exploded relationship for purposes of illustration. FIGS. 3, 4, and 5 are views which portray the three major components of FIG. 2 in assembled relationship in RV 50, along with additional detail.

The three major components illustrated in FIG. 2 are a base member 102, a holding tank 104 and a bench, or seat section, 106. The bench section and the base member are built into RV 50 while the holding tank is removably stowed between the bench section and the base member in a stowage compartment 108.

The lowest part of base member 102 is disposed on the RV's floor 64. A load bearing structure (not shown in FIG. 2) provides the principal load bearing support for holding tank 104 and bench 106 and has a certain cooperative association with base member 102. This load bearing structure appears in FIGS. 3, 4, and 5 as a box frame 110 on floor 64. Base member 102 has a cooperative association with this load bearing box frame 110 in that the box frame supports the perimeter of base member along four sides.

Base member 102 may be considered to comprise a horizontal wall portion 112 disposed on the load bearing structure so that this horizontal wall portion is therefore disposed at a level above floor 64. Two pans 114 and 116 are formed in base member 102 and in the preferred embodiment are identical and symmetrically disposed to either side of the center of wall portion 112. These pans have a depth corresponding to the distance of horizontal wall portion 112 above floor 64 so that the bottoms of the pans are disposed against the floor. The pan bottoms may be provided with embossments 118 (see FIGS. 4 and 5) containing apertures through which fasteners 120, such as screws, are passed to attach member 102 to floor 64. The box frame 110 relieves the load of the tank and bench from these pan structures enabling member 102 to be formed as a plastic part by injection molding. As appears in FIG. 5 the underside of wall portion 112 may be provided with ribs 122 at selected locations which actually bear on the box frame 110.

For convenience, toilet system 100 will be described for installation in RV 50 such that a user seated on bench 106 will face the front of the RV, and for a right-hand installation so that the left hand ends of the components in FIG. 2 confront the RV's right exterior sidewall 66c as appears in FIG. 1. The motion of the holding tank into and out of the stowage compartment in the direction of arrow 128 will therefore be longitudinally of the holding tank and base and bench, but transverse relative to the RV. Similarly the transverse, or lateral dimensions of the bench, holding tank and base will be longitudinally, or front to back, in the RV. It is to be understood that this terminology is simply for convenience in description and is not to be construed in a limiting sense affecting scope of the invention. Indeed it is entirely possible that bench, base, and tank could be configured with different shapes or their longitudinal dimensions might lie fore and aft, or at a different angle, in the RV.

Base member 102 incorporates a track structure for supporting holding tank 104 within stowage compartment 108. This track structure is formed by a pair of spaced apart upwardly projecting formations from horizontal wall portion 112 which cooperate with the contiguous portions of wall 112 in forming parallel tracks 124, 126. Tracks 124, 126 serve to guide the track for motion into and out of the stowage compartment along a straight line direction represented by the arrow 128 in FIG. 2.

The holding tank is supported along its lower longitudinal edge portions as is perhaps best seen in FIG. 5. There is a close conformity in fit of the holding tank with respect to tracks 124, 126 for accurate straight line guidance of the motion of the holding tank on the base. By making tank 104 and base member 102 out of suitable plastic materials having reasonably low coefficients of friction, the tank can be slid directly on the tracks into and out of the stowage compartment.

Base member 102 comprises a horizontal wall portion 136 on the side of track 126 opposite, and approximately at the same level as, horizontal wall portion 112. As can be seen in FIG. 5 this wall portion 136 bears against the top of the front of box frame 110, and the front of the box frame extends the full length of the base below wall portion 136. A vertical wall 138 extends upwardly from the frontal edge of wall portion 136.

For a majority of its length this vertical wall 138 has a nominal height, but at the ends of the portion of nominal height, the wall continues upwardly as wing-like formations 140 and 142. Between these wing-like formations 140 and 142 and extending along the top of the nominal height portion of wall 138 is a forwardly directed horizontal flange 144. The flange 144 and the wind-like projections 140 and 142 form an upwardly open cavity 146 which fits in a flush manner with respect to the frontal portion 147 of bench 106. In this regard the front vertical corners of bench 106 are contoured with recesses matching the wing-like formations 140 and 142. The lower front edge 149 of the bench rests on and is supported by flange 144 with there being suitable means of attachment 148 to secure the two together. Thus when the sections are assembled, an attractive frontal appearance is presented because of the flush fit of the bench onto cavity 146, while adequate support is provided for the front of the bench to the RV floor through the base and load bearing framework.

The rear of bench 106 is supported from the rear of base member 102 through a plate member 152 which has a lower flange 150 resting on and screwed to base member 102, as at 151. Plate member 152 extends upwardly to the upper rear edge area 154 of the bench. The toilet 100 is disposed against a vertical back wall 156, a part of the RV, and member 152 can be attached to that wall 156 thereby providing additional support.

The left hand ends of the components which appear in FIG. 2 are disposed directly against the RV wall 66c and the opposite ends are disposed against a wall 160 (see FIG. 3) parallel to wall 66c. Thus stowage compartment 108 is completely separated from the interior occupant space by base frame 110, base member 102, bench 106, and the RV's walls. The stowage compartment per se is open at opposite lengthwise ends but the RV's wall 160 closes one end. The other end, which appears at the left in FIG. 2 confronts access opening 70 in sidewall 66c. Hence the stowage compartment is isolated from the interior occupant space of the RF, access being had only through opening 70 after door 72 has been opened.

The toilet comprises a bowl 162. An associated ring 164 and cover 166 are hingedly mounted on bench 106 adjacent the rear of the bowl for swinging motion in the sense represented by arrow 168 between up and down positions.

The bench includes a water storage chamber 170 which surrounds bowl 162. This chamber 170 contains a supply of fresh water for use in flushing of the bowl. Operation of the toilet is controlled by a knob 172 which in FIG. 2 is shown disposed on the top of the bench to one side of the bowl. The particular shape of the bench is a space-efficient one and in general it may be said to comprise cavities 176, 178 at its longitudinal ends which have a cooperative arrangement with certain additional features of the system to be subsequently explained.

Further details of holding tank 104 appear in the foregoing, as well as additional, drawing figures. While FIGS. 6, 7, 8, and 9 are primarily to portray a sequence for removal of the holding tank from the stowage compartment, certain details of the holding tank structure can be seen in these figures. Holding tank 104 has a generally overall rectangular shape comprising a top wall 180, a sidewall 182, and a bottom wall 184. The top wall contains a central dome which has a circular opening 188 which is opened and closed by a valve blade 274 within the tank. When the tank is stowed within the stowage compartment, opening 188 registers in a sealed manner with the outlet from bowl 162, and blade 274 controls the passage from the bowl into the holding tank. Details will be subsequently explained in later description.

The holding tank body is fabricated from an upper and a lower molded plastic part which are joined together in a sealed manner around a continuous seam 189. The upper plastic part contains top wall 180 and an adjacent marginal portion of sidewall 182. The lower plastic part contains the remainder of sidewall 182 and the entirety of bottom wall 184.

The size and capacity of holding tank 104 are such that it can hold a meaningful amount of waste so that frequent emptying of the tank can be avoided, yet not so large that the tank is overly difficult to remove, transport, and dump by an average adult even if full. The holding tank contains handles which have a certain symmetry on the tank. Two handles 190, 192 are provided on top wall 180 on opposite sides of opening 188, and there are two handles 194, 196 at opposite longitudinal ends of the tank sidewall. These ends of the tank are configured with suitable recesses 198, 200 spanned by handles 194, 196 to enable a person's hands to conveniently grip the handles. Likewise there are recesses 202, 204 in top wall 180 which are spanned by handles 190, 192 enabling these handles to be conveniently grasped. Hence the tank has two handles disposed longitudinally to one side of opening 188 and two handles to the other side, with the two handles on the one side being symmetrically arranged relative to the two handles on the other side. By providing four handles in the symmetrical manner just described, the tank is suited for installation and removal in not only a forward facing right hand system installation as illustrated, but also in a forward facing left hand system installation where the toilet system 100 is disposed against the RV's left sidewall 66c, and access to the stowage compartment is obtained by providing opening 70 in that left sidewall.

For the right hand system installation, handle 194 confronts opening 70 so as to be disposed for convenient grasping when the tank is to be withdrawn. Withdrawal can be continued using this handle and/or the immediately adjacent top wall handle 190. When the tank has been further, but not completely, withdrawn, the top wall handle 192 can now be grasped and the tank carried completely out of the stowage compartment with two hands. For transport to a disposal site, the tank can be carried at the person's side one-handed by grasping one of the handles, 194, 196. For typical removal from a right hand system as shown, natural action will result in the tank being carried one-handed via handle 196. Hence the handles have functional significance not only for a construction which fits both a right hand as well as a left hand system, but also for a construction which fits only one or the other type of system.

The holding tank also includes a rotatable pourspout 210 mounted in a hole 212 in one of the corners of top wall 180. Pourspout 210 has a keyed and sealed engagement with a hole 212 to maintain sealing contact between the spout and the tank for all positions of rotation about the axis of the hole, and to prevent separation of the pourspout from the tank for all positions of rotation, save the unique position at which the pourspout can be removed and installed.

FIGS. 6, 7, and 8 illustrate pourspout 210 in its stowed position where it overlies top wall 180. The end of the spout is shown closed by a removable closure cap 214. The pourspout is operable from its stowed position to a range of pourout positions, one of which is portrayed in broken lines in FIG. 8 simply for convenience in illustration. In pourout position the pourspout points away from tank 104 beyond its sidewall 182. Further details of the keyed and sealed connection of the pourspout on the holding tank will be explained later.

There is a further hole 216 in top wall 180 at the diagonally opposite corner from hole 212. Hole 216 contains a vent valve assembly 218. The vent valve assembly includes a fitting which has a keyed and sealed engagement with hole 216 in the same manner as the keyed and sealed engagement of the pourspout with hole 212. This enables the pourspout and the vent valve assembly to be reversed on the holding tank so that for a forward facing left hand system installation, the pourspout can be mounted in hole 216 adjacent opening 70 in the left sidewall 66c of the RV and the vent valve assembly in hole 212. In the illustrated right hand installation, the pourspout is mounted on the front right hand corner of the top wall of the holding tank (as referenced to the RV), while the vent valve assembly is at the rear left hand corner. For a left hand installation the pourspout will be mounted at the left rear corner and the vent valve assembly at the right front corner. Accordingly, in a right hand installation, the pourspout, in its stowed position, will point to the rear of the RV; in a left hand installation, it will point toward the front of the RV.

From consideration of the description of the pourspout it can not be appreciated that the purpose of cavity 176, described earlier, is to provide a space for the stowed pourspout when the holding tank is stowed within the stowage compartment in a right hand installation. Cavity 176 also contains space for a fill 220 which is used in filling water storage chamber 170. Details of the fill will be explained later on. FIG. 6 shows fill 220 disposed over the rear of the stowed holding tank. For a left hand installation, fill 220 is disposed in cavity 178 to overlie the left rear of the holding tank. Hence, it is to be appreciated that cavity 178 is essentially the mirror image of cavity 176 about plane 224 for providing space for the fill and pourspout.

As earlier mentioned, opening 188 is controlled by blade 274 within the interior of the tank. While details of the blade will be subsequently explained, it can be noted for the moment that the path of blade motion within the tank is a horizontal arcuate one which occurs about a vertical axis 222 spaced from opening 188 to one side of an imaginary vertical plane 224 passing transversely through both the tank and the opening and also bisecting both. Hence, axis 222 is asymmetrical on the tank, and this means that in both right hand and left hand system installations, the holding tank must be positioned in relation to the bench in exactly the same way even though pourspout 210 and vent valve assembly 218 have interchangeability in the respective holes 212, 216 and holes 212, 216 are equidistant from plane 224 and also equidistant from an imaginary plane 226 which bisects the tank at 90° to plane 224.

In view of the description thus far, it is believed that the general organization and arrangement of the major components is fairly apparent. They are organized and arranged in a space efficient manner, well suited for recreational vehicle usage; moverover the usual servicing of the toilet, i.e. filling of the water storage chamber, and removal of the holding tank for dumping accumulated waste contents, are performed entirely from the exterior of the RV so that these activities do not take place in or through the interior occupant space.

Attention can now be directed to more of the details of the aforementioned components.

One significant feature of the invention is that holding tank opening 188 automatically connects to and disconnects from the toilet bowl outlet in accompaniment of moving the holding tank into and out of stowage compartment 108. Likewise the coupling between operator knob 172 on bench 106 and the valve blade which opens and closes opening 188 also automatically connects and disconnects with the movement of the holding tank into and out of the stowage compartment.

For a toilet installation, it is important for the separable connection between the holding tank opening 188 and the toilet bowl outlet to be of a sealed nature when connected, and this is accomplished by the invention. Briefly, the guidance provided for holding tank 104 by tracks 124, 126 will serve to establish fairly precise alignment for proper registration of the blow outlet opening and the holding tank opening. An additional means however is associated with the bowl outlet opening and the holding tank opening to take into account certain tolerance variations which will inherently exist in the commercial manufacture of the product to insure that the final connection is properly sealed. Details are shown in FIGS. 10-18B.

A flange member 230 is fitted around the bowl outlet opening 231 at the bottom of the bowl. Member 230 forms one part of the guide mechanism for guiding the holding tank opening into precise final registry with the bowl outlet opening. The other part of the guide mechanism is formed by a member 232 which attaches to the top wall of holding tank 104 around opening 188.

Member 232 comprises a central annular portion 233 which serves to retain an annular elastomeric seal 234 on tank 104 around opening 188. Specifically seal 234 comprises a main body 236 which is disposed in a circular cavity 238 around the circular opening 188. A pair of annular lips 237, 239 project from main body 236. The annular retention portion 233 fits onto the top holding tank surface around cavity 238 and compresses the annular body of the elastomeric seal downwardly in the cavity to provide a seal of the elastomeric body to the holding tank around opening 188. Member 232 further comprises channels 244, 246 formed along its longitudinal side edges parallel with the direction of movement of the holding tank into and out of the stowage compartment.

Flange member 230 comprises an annular portion 250 which fits on the bowl outlet and side edge portions 252, 254 which, like channels 244, 246, are parallel with the direction of motion of the holding tank into and out of the stowage compartment. These side edge portions are nominally straight and parallel, but their ends are curved for reasons to be subsequently explained.

The two members 230, 232 are so disposed around the bowl outlet and holding tank opening respectively so that the side edge portions 252, 254 slide into and out of the side edge channels 244, 246 as the tank is moved into and out of stowage. Each channel has essentially a 90° cross section composed of a horizontal side and a vertical side. The vertical clearance dimension from the horizontal sides of the channels to the top of lip 237 is less than the thickness of the side edge portions 252, 254 of flange member 230, and therefore a very precise vertical fit occurs as the member 232 slides onto the flange member 230 so that a controlled deflection of lip 237 results. Similarly the nominal width of the flange member across the straight portions of its side edges is just slightly less than the clearance width between the vertical sides of the two channels 244, 246.

Because of tolerance considerations, the guidance of holding tank 104 by base member 102 may happen not to produce the exact precise alignment which is required to lodge the side edge portions 252, 254 within channels 244, 246. Consequently, means are provided which function upon initial engagement of the two members 230, 232 to compensate for initial departures from the precise final alignment which is required to fit the members 230, 232 fully together, and there are several possible ways for the slight misalignment to be taken out. Because member 232 is mounted on the domed central region of the tank, and the tank is constructed of a walled plastic material, it is possible for some limited deflection of the top wall to occur. There may also be some very slight movement of the holding tank on the tracks as it is being slit onto the stowage compartment. There could also be a limited deflecting of one or both members 230, 232 but any such deflection is to be minimized because the members 230, 232 play important parts in insuring that the proper final sealing action takes place. The illustrated member 232 is securely attached to the holding tank by eight screws 258 and is quite rigid so that it will exhibit essentially no deflection per se.

The side edge channels 244, 246 of member 232 are open at both lengthwise ends and the flange member projects from both sides of the bowl outlet to endow this joint between the bowl outlet and holding tank opening with the ability to connect and disconnect irrespective of which direction the holding tank is moved into and out of the stowage compartment (i.e. irrespective of right hand or left hand installations). Thus when the tank is inserted from one direction, one end of the flange member 230 and the confronting end of member 232 become the leading ends of the guide mechanism which make initial engagement. If the tank is installed from the opposite direction, the other ends of the two members become the leading ends which make initial engagement with each other. Leads are provided in the ends of the members 230, 232 and in the case of member 232 take the form of upturned corners 260 in the horizontal sides of the channels and in the case of flange member 230 comprises the lengthwise ends of the side edge portions 252, 254 being curved inwardly toward each other at 262.

The elastomeric annular seal 234 has lips 237, 239 around the inner periphery of its body 236. Lip 237 is canted upwardly toward the bowl outlet. In relaxed condition the free edge of this lip projects above the nominal level of the flat horizontal lower surface of flange member 230. The relative position of the free edge of this lip is such that when members 230, 232 are fully engaged to place the tank opening 188 in vertical alignment with the bowl outlet opening, lip 237 is deflected slightly downwardly from its free position to thereby exert an upward sealing force around and against that portion of flange 230 which fits around the bowl outlet. In the disclosed embodiment the seal makes actual contact with member 230 because annular portion 231 of the member fitting onto the bowl outlet member constitutes a continuation of the bowl outlet opening. Hence reference to sealing of the bowl outlet opening can refer not only to the disclosed embodiment, but in other embodiments to contact with the bowl or a separate conduit coming from the bowl. Because the outlet opening surface against which the seal makes contact is a part of the flange member in the disclosed embodiment, precision in control of the seal lip deflection is improved because the surface against which the seal acts is a part of the same member which provides guidance for securing desired precise alignment in registration between tank opening and bowl outlet.

The second lip 239 below the level of the first lip 237 is canted downwardly toward the holding tank and has a cooperative association with a blade 274 which opens and closes opening 188 so that when the blade is closed the second lip 239 is deflected slightly upwardly to provide annular sealing contact with blade around opening 188.

Because the edge of the upper sealing lip 237 in its free condition will be above the level of the surface against which it is to seal, it will be deflected downwardly as the tank is connected to the bench. This downward deflection is imparted to the lip by flange member 230. As the connection is being made, the downward deflection over the first semi-circular half of the lip will be in the same direction as its natural flexing. However over the second semi-circular half the action will have a component which could tend to curl the lip, an undesirable result, particularly at the end.

To guard against this, the opposite leading ends of flange member 230 are configured with inclined surfaces 280 between the side edges which act on the seal to assist in deflecting the seal so that such curling is avoided. One surface will be effective for one direction of insertion, and the other surface for the opposite direction. The contact which is made with seal lip 237 by this inclined surface will act on the lip in a manner which tends to deflect the lip downwardly rather than curling it. Consequently when the tank is fully installed in the stowage compartment the entire periphery of the lip is in proper sealing contact with the bowl outlet.

Upon withdrawal of the tank the seal moves out of sealing engagement and the upper lip will tend to return toward its free non-deflected position. Because the amount of deflection to require sealing must be carefully controlled, the organization and construction which has been illustrated is especially advantageous in securing this type of control. The seal is related to the holding tank in a predetermined manner by member 232 which integrally contains the side edge channels 244, 246. Likewise, the flange member 230 which has the side edge portions 252, 254 which fit within these side edge channels also contains the surface against which the upper lip seals. Moreover, the relationship of the seal on the holding tank also serves to locate the lower slip 239 in proper relation for the correct sealing of the blade 274. Thus the overall arrangement is particularly advantageous for securing proper sealing in accompaniment of the act of moving the holding tank into the stowage compartment. In other words no separate manipulation or operation is required in order to make the seal other than the mere act of inserting the tank into the stowage compartment. The seal deflecting surface 280 can also serve to assist in guiding the tank into proper final connection.

Leads 262 compensate for any horizontal lateral misalignment which may exist as member 230 is being inserted into member 232.

Figure 10:
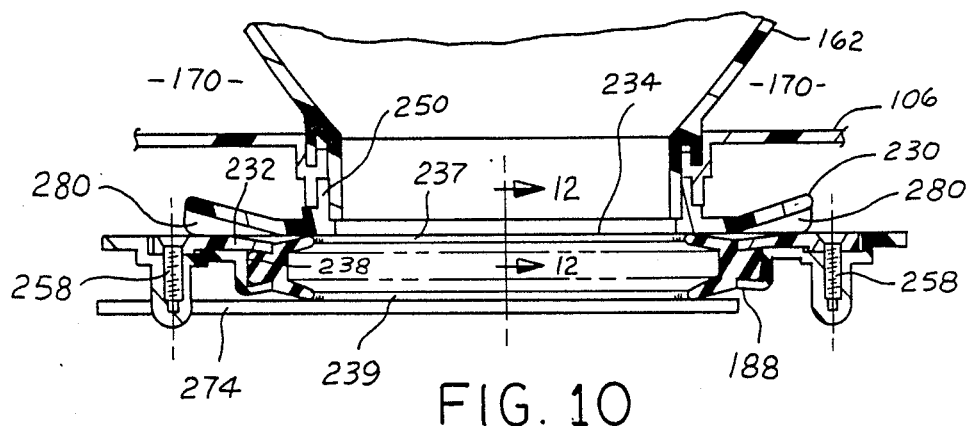
FIG. 10 is an enlarged fragmentary vertical sectional view taken in the direction of arrows 10—10 in FIG. 3.
Figure 11:
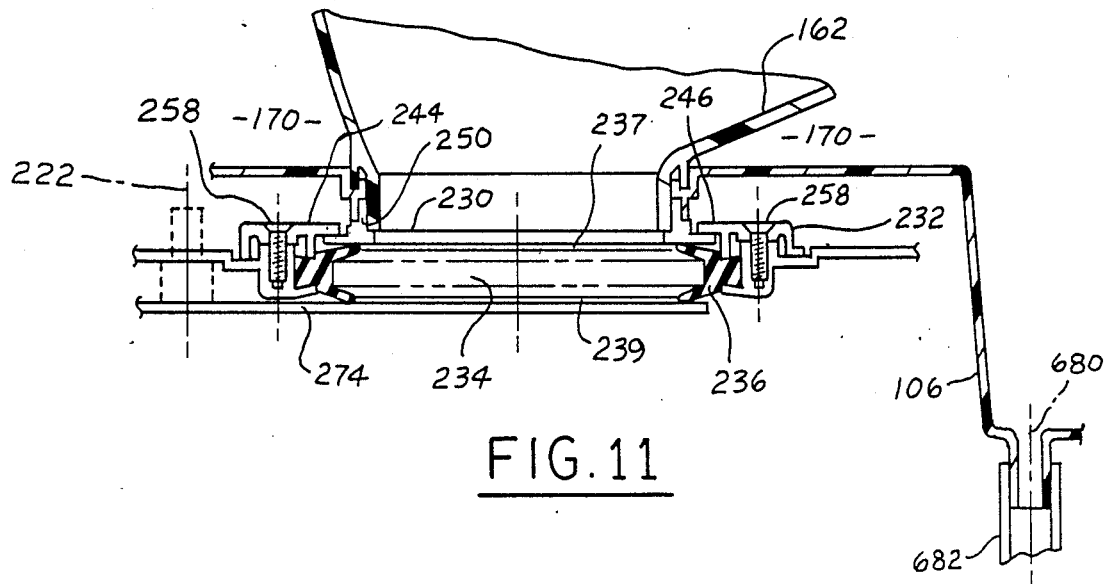
FIG. 11 is an enlarged fragmentary vertical sectional view taken in the direction of arrows 11—11 in FIG. 3.
Figure 12:
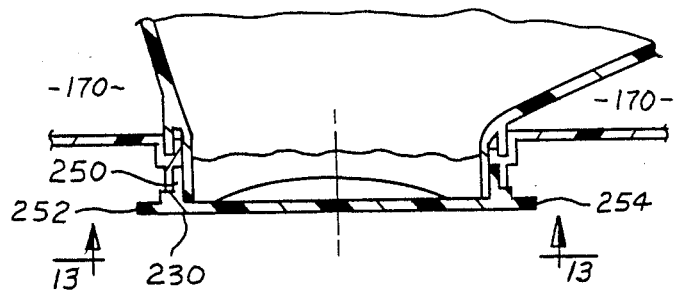
FIG. 12 is a fragmentary vertical sectional view taken in the direction of arrows 12—12 in FIG. 10, with a portion broken away.
Figure 13:
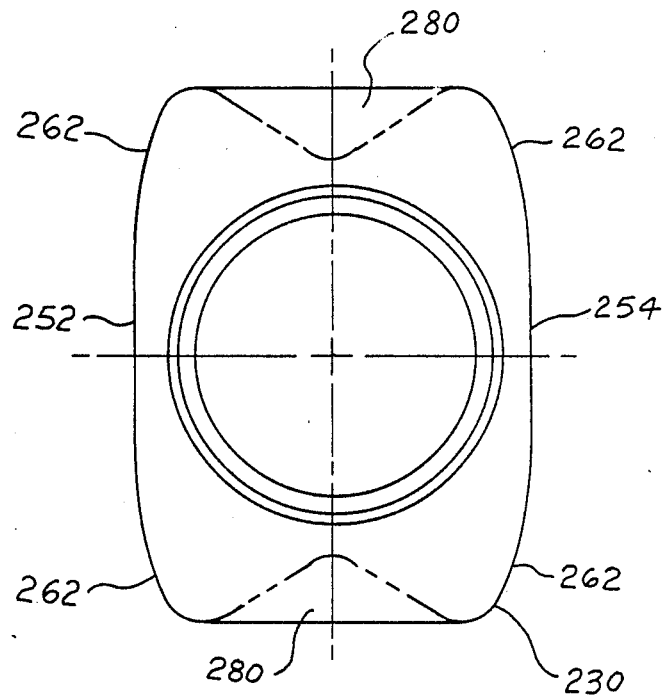
FIG. 13 is a view in the direction of arrows 13—13 in FIG. 12.
Figure 14:
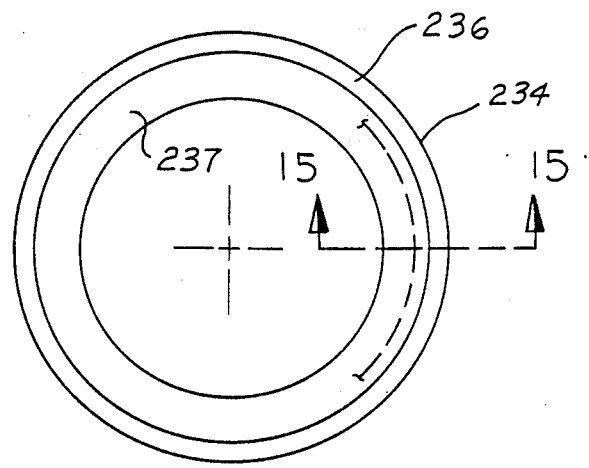
FIG. 14 is a plan view of one of the components of FIG. 10 shown by itself.
Figure 15:
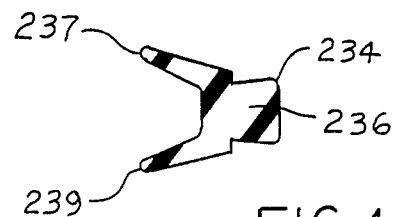
FIG. 15 is a sectional view taken along line 15—15 in FIG. 14.
Figure 16:
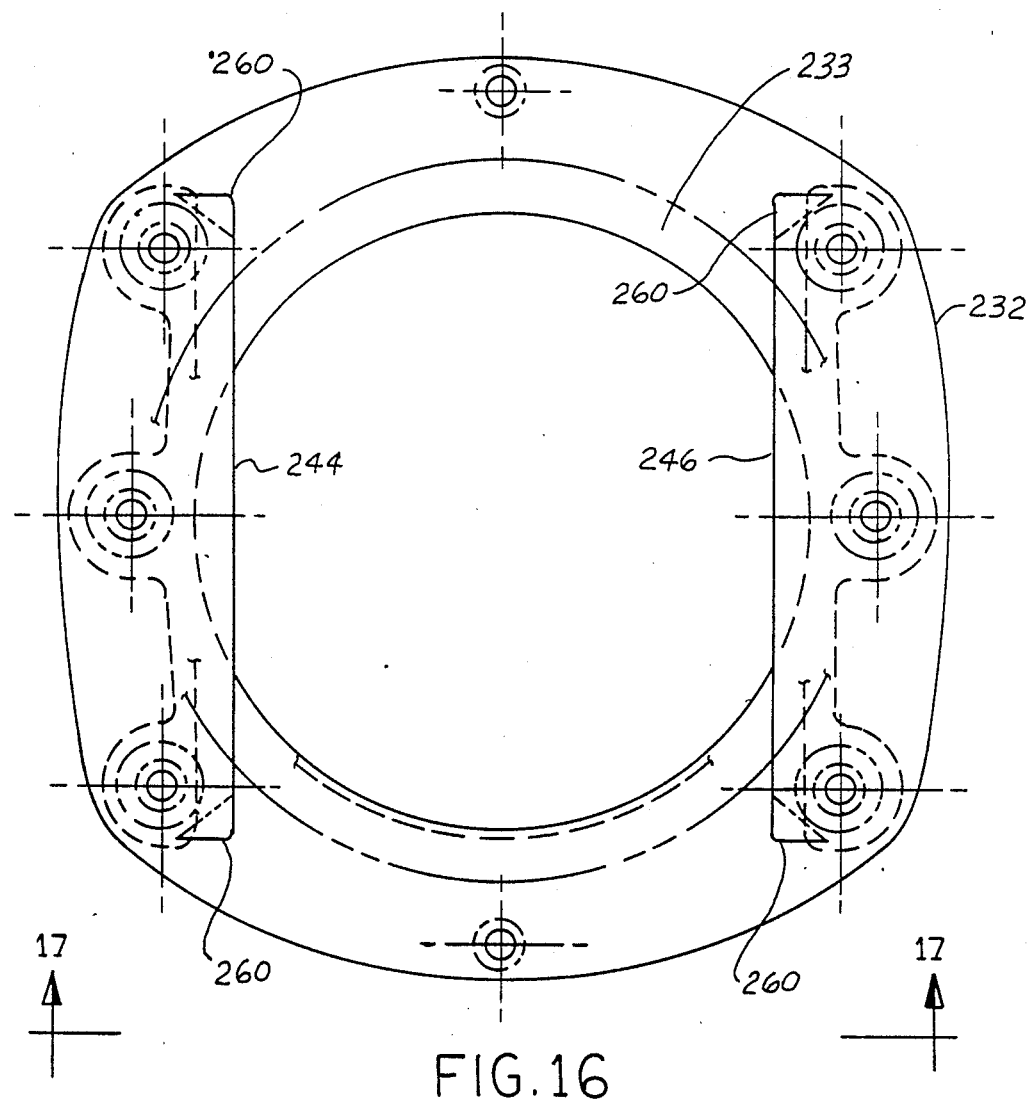
FIG. 16 is a top plan view of another of the components of FIG. 10 shown by itself.
Figure 17:
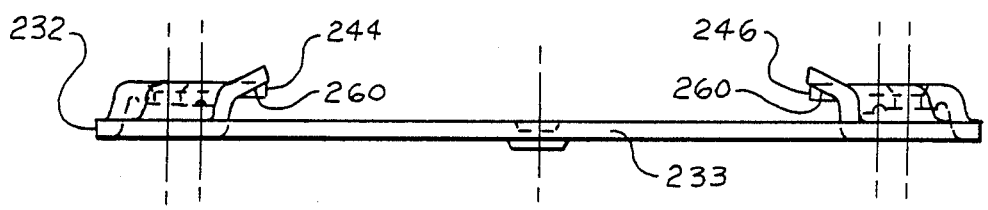
FIG. 17 is a view taken in the direction of arrows 17—17 in FIG. 16.
Figure 18A:
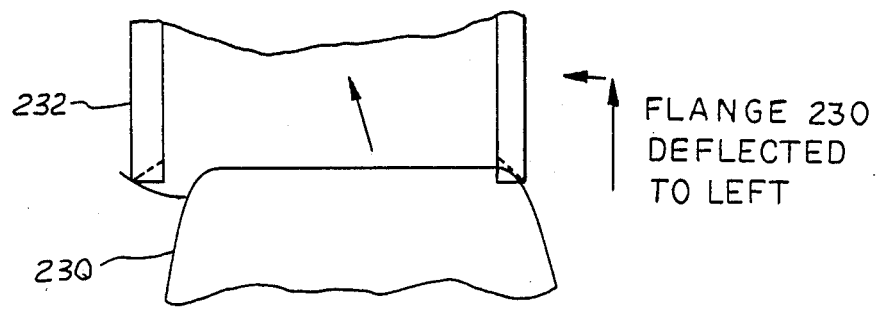
FIGS. 18A and 18B are diagrammatic views illustrating particular relationships relevant to FIGS. 10-17.
Figure 18B:
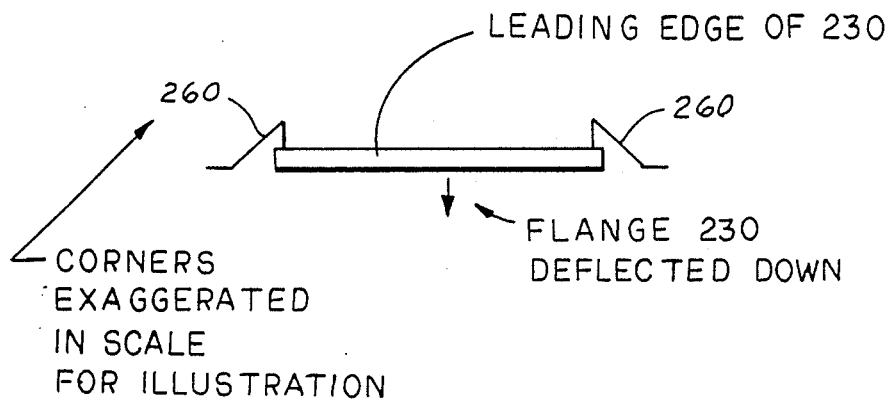
Figure 20:
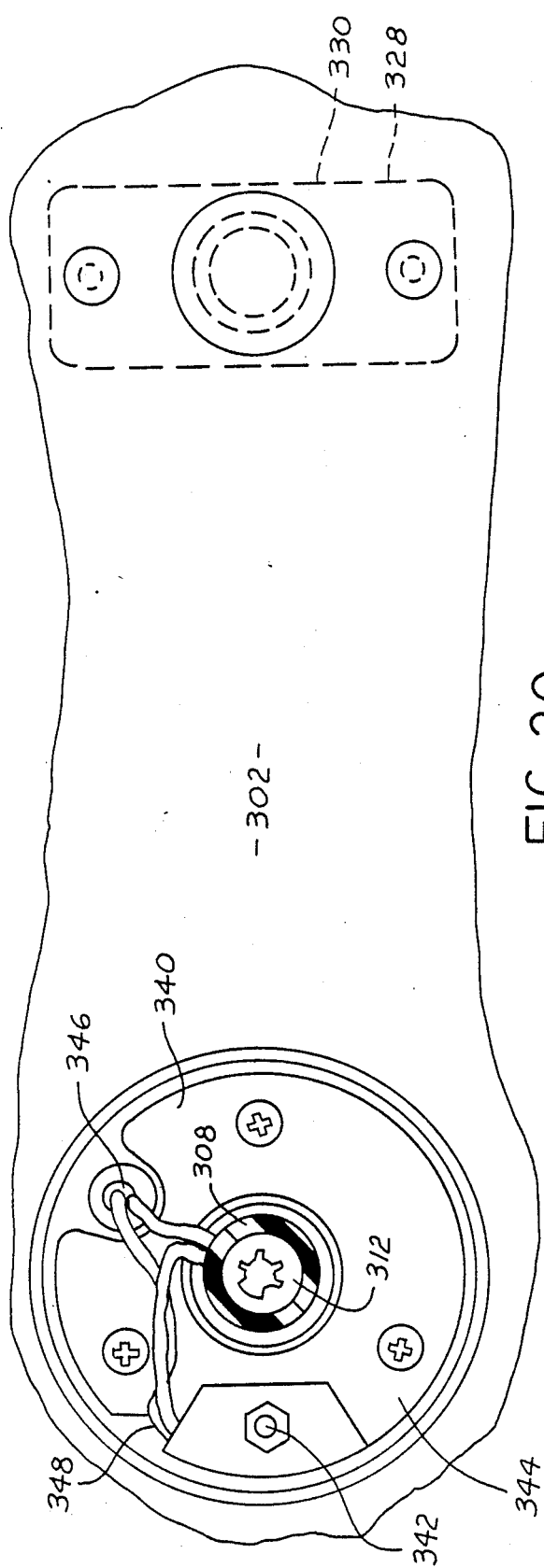
FIG. 20 is a fragmentary horizontal top view in the direction of arrows 20—20 in FIG. 19.
Figure 21:
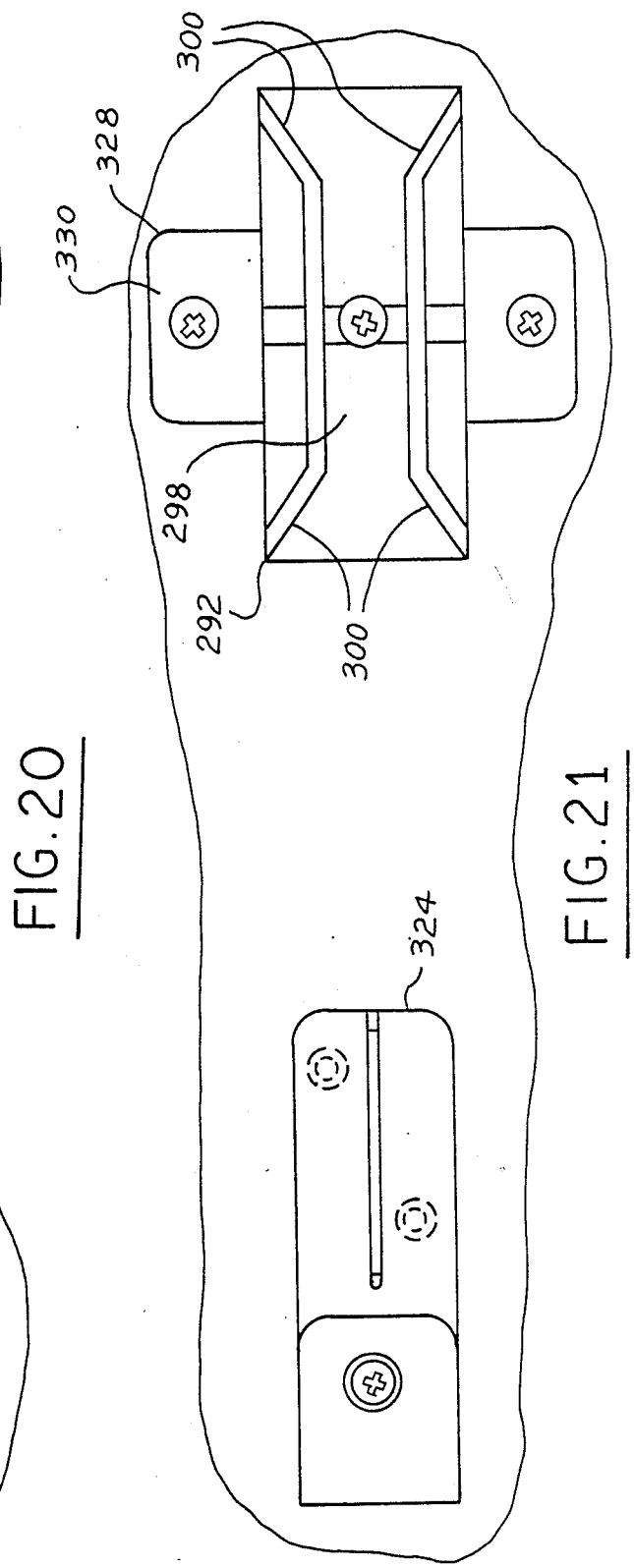
FIG. 21 is a fragmentary horizontal bottom view taken in the direction of arrows 21—21 in FIG. 19.
Figure 26:
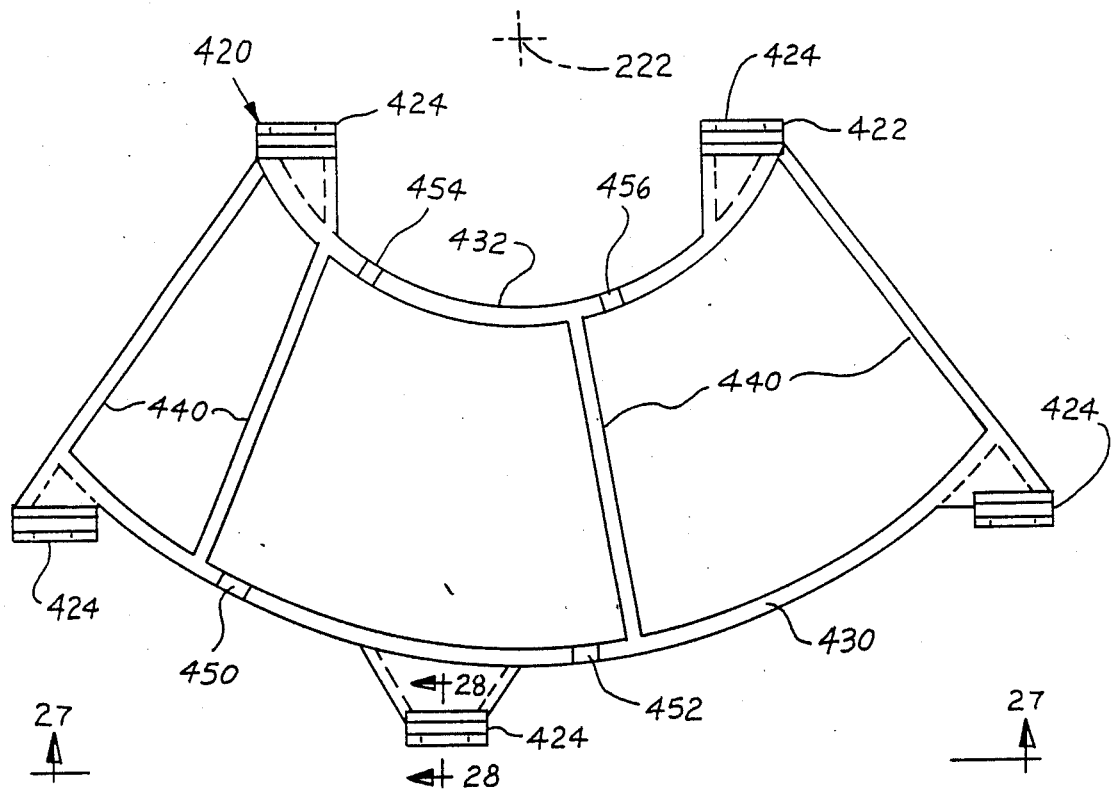
FIG. 26 is a top plan view of a member which has a cooperative association with the mechanism shown in FIG. 25.
Figure 27:
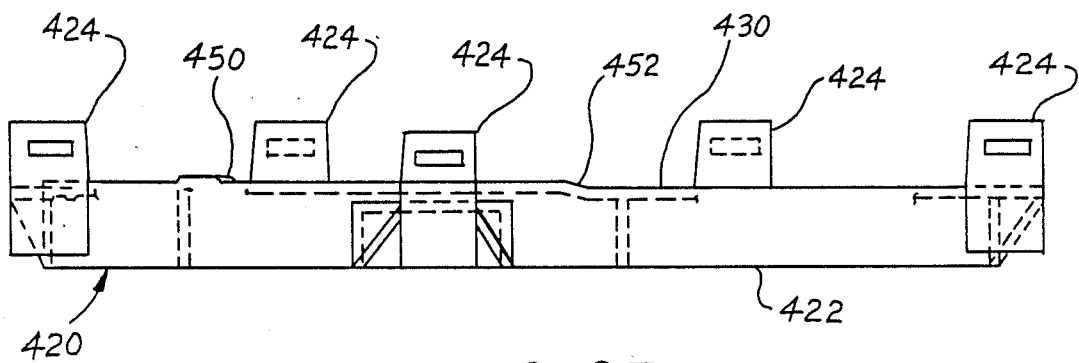
FIG. 27 is a vertical view taken generally in the direction of arrows 27—27 in FIG. 26.

The upturned corners 260 are flat surfaces but at an oblique angle to both the horizontal and the vertical. As such they present surfaces which will serve to engage the leading ends of the flange member in a manner which not only will primarily compensate for any vertical misalignment which may exist as the two members are being inserted together, but also cooperate with leads 262 to compensate for horizontal misalignments. The compensation for any horizontal lateral and vertical misalignments will result in flange member 230 being brought to the final position as represented in FIGS. 10–12 with the holding tank fully stowed within the stowage compartment. FIGS. 18A and 18B portray the relationships involved. While the nominal design of the system is such the flange member 230 will fit into the guide member 232 in a manner which will have the final precise alignment, it is more likely because of tolerances, that the leak and/or seal deflection surface will be operative to bring the two parts into the final precise sealing alignment when the tank is fully stowed. Thus connection and disconnection of the sealed coupling between the bowl outlet and the holding tank occurs automatically in accompaniment of bodily motion of the holding tank into and out of the stowage compartment.

Blade 274 is operated between open and closed positions from knob 172 via a coupling member, 290 generally. A portion of this coupling mechanism is disposed on bench 106 and another portion is on holding tank 104. The portion of the mechanism on the bench is portrayed in FIGS. 19–23 and will be described in detail shortly; for the moment it can be noted it comprises an actuating member 292 which is concentric with axis 222. Likewise the portion of the mechanism on the holding tank comprises an actuated member 294 disposed on the top wall of the holding tank concentric with axis 222 when the holding tank is in stowed position. In the tanks' stowed position, the actuating and the actuated members are operatively connected in a driving relationship whereby motion of the actuating member about axis 222 imparts rotary motion to the actuated member about axis 222. It is this motion which in turn operates blade 274.

The operative coupling between the actuating and actuated members is in the form of a disconnectable connection which makes and breaks in accompaniment of bodily motion of the holding tank into and out of the stowage compartment. Basically the nature of the operative coupling between the actuating and actuated members is in the form of a diametrical tongue 296 on one of the members, the actuated member in this embodiment, and a diametrical slot 298 on the other, the actuating member. When the valve has been operated to the closed position from knob 172, the diameters of the tongue and slot lie on a line which is parallel to the direction in which the holding tank moves into and out of the stowage compartment. Because the ends of the slot are open, the tongue can move radially relative to the axis 22 allowing connection and disconnection to occur.

Operation of the connected coupling to a position which opens blade 274 will result in the diameters of the slot and tongue being moved out of parallelism with the direction of movement of the tank into and out of the stowage compartment. Consequently if an attempt is made at this time to remove the stowed tank from the stowage compartment, the misalignment of the connection relative to the direction of tank removal will restrict the movement of the holding tank and prevent it from being removed from the stowage compartment. This is an advantageous feature because it requires that the valve be closed before the tank is withdrawn and this can avoid potential splashing of tank contents out of the open opening 188 or other undesired consequences which could result from an open blade. By slot 298 being open at both ends, the ability to make the connection will occur for either direction of insertion of the holding tank into the stowage compartment. Consequently the mechanism is useful for both right hand and left hand system installations.

When the tank is removed from the stowage compartment, it could happen, for some reason or another, that actuating member 292 has been rotated about axis 222 so that the diameter of slot 298 is no longer in alignment with the direction of insertion of the tank into the stowage compartment. By providing leads 300 at both ends of the slot, the initial engagement of tongue 296 with the lead will serve to bring the actuating member back into a properly aligned position, and in this regard the operating mechanism on the bench is configured not to seriously resist this realignment.

Although the portion of the operating mechanism which is on the bench appears to extend through the bench, it does so externally of the water stowage compartment 170. For this purpose the bench is configuration with an appropriate wall configuration below knob 172. Bench 106 comprises an upper plastic part 302 and a lower plastic part 304 joined around a seam 306. A tower 308 is fashioned in the lower part 304 and projects upwardly to have a sealed fit through an aperture 310 in the upper half part 302. This can be seen in FIG. 19. The cooperative effect is to provide a vertical passage 312 through the bench from the top surface of the bench through to a cavity area 314 in which a further portion of the operating mechanism is disposed.

The operating mechanism includes a shaft member 318 disposed in passage 312 and supported for rotation about a vertical axis 320. Knob 172 has a snap-on attachment to the upper end of shaft 318 which couples the knob to the shaft such that circumferential motion imparted to the knob about axis 320 is imparted to the shaft. The lower end of the shaft is supported by a suitable bracket structure 324 from the wall of the bench and contains a sprocket 326.

The actuating member 292 is supported for rotation on the lower wall of the bench by a suitable mount 328. The mount has a base 330 attached to the bench and containing a stub shaft 332 on the lower end of which actuating member 292 is disposed. The outside of shaft 332 contains a sprocket 334 which is at the same elevation as sprocket 326. An endless drive chain 336 wraps around the two sprockets whereby rotation which is imparted to sprocket 326 from knob 172 is transmitted to rotate sprocket 334 and hence actuating member 292. In this way the rotary motion imparted to the knob is effective to impart rotary motion to the actuating member and ultimately to the valve blade.

The knob is also capable of being moved axially of axis 320. The top wall of the holding tank and the knob are shaped to provide an annular compartment 340 within which an electric push button switch 342 is disposed. The switch body is mounted by a suitable bracket 344 to support the push button against the underside of the top of the knob. The switch is normally open for the solid line position depicted in FIG. 19, but when knob 172 is depressed to the broken line position, the push button is operated causing the switch to close.

Lead wires 346, 348 extend from the switch to an electric circuit connection with an electric pump located within the tank water storage chamber when the installation is of the electrically operated flush type, and to an interlock in the form of a switch (not shown) which is closed only when the holding tank is in fully stowed position. Consequently only when the tank is fully stowed is the knob effective to operate the electric pump. Because the single knob independently controls both the electric pump, and the valve blade, the operation of the toilet is rendered particularly convenient for a user by this operating arrangement. A return spring 349 returns the knob from the depressed to the nondepressed state upon release.

Blade 274 is disposed within holding tank 104 for arcuate motion about axis 222, as previously noted. The general shape of the blade is portrayed in FIG. 25. The blade comprises a hub portion 370 which is concentric with axis 222 and a blade portion 372 projecting radially of the generally circular hub portion.

Blade 274 has an operative coupling with actuated member 294 as portrayed in FIGS. 24 and 25. The coupling is through a rotary lost-motion connection which is provided by a vent valve member 376 of an associated vent valve 378. The purpose of vent valve 378 is to provide for venting of the tank headspace just before the blade opens. This venting is advantageous and the general principle is already described in U.S. Pat. No. 4,145,773, commonly assigned.

Actuating member 294 is journaled within an opening 380 in the top wall of the tank in a sealed manner and has an integral shaft portion 382 projecting into the tank. This shaft portion has a non-circular cross sectional shape and vent valve member 376 is fitted onto it via a matching hole in a central hub portion 392 of member 376. A blade portion 394 projects radially from hub portion 392. Member 392 is axially kept on shaft 382 by integral flexible catches, or barbs 395, on the axial end of the shaft. The two members 376 and 294 are retained on the tank by axially capturing the holding tank top wall.

The lost-motion connection between members 274, 376 is provided in the vicinity of their hub portions. Valve 274 has a circular hole 397 which fits concentrically onto an axial portion 399 of member 376. Member 376 comprises a pair of downwardly projecting stops 400, 402 spaced circumferentially apart. Blade 274 is circumferentially captured between these stops, and it has circumferentially spaced stop surfaces 404, 406 which circumferentially confront the respective stops 400, 402. The circumferential spacing between stop surfaces 404, 406 is however less than the circumferential spacing between two stops 400, 402 so that there is a certain lost-motion between the two members, and in the disclosed embodiment is about 15°. A venting aperture and seal 410 is provided in the tank's top wall. In FIGS. 24 and 25, the venting aperture is closed by blade 394 on member 376 and opening 188 is closed by blade portion 372 of member 274.

Operation of knob 172 in the valve opening sense will operate through coupling mechanism 290 to turn actuated member 294 in a sense which will impart motion to vent valve member 376 in the counterclockwise sense as viewed in FIG. 25. Consequently the vent valve blade opens the vent thereby venting the headspace of the tank as the lost-motion between stop 400 and stop surface 404 is taken up.

Once stop 400 has abutted stop surface 404 (FIG. 25A), continued motion imparted to member 376 will now also rotate member 274 in the counterclockwise sense as viewed in FIG. 25 so that the two members turn in unison until the valve blade has fully opened (FIG. 25B).

When opening 188 is to be closed, rotation of knob 172 in the valve closing sense will rotate the member 376 in the clockwise sense as viewed in FIG. 25. Member 274 will begin to close only after the 15° lost motion has been taken up with stop 402 abutting stop surface 404 (FIG. 25C). Continued rotation in the closed sense returns the two members to the position of FIG. 25. This then has described the general manner of operation of the valve blade and associated vent valve. Track structure 420 is also associated with the valve blade and will be described with reference to FIGS. 26-29.

Figure 28:
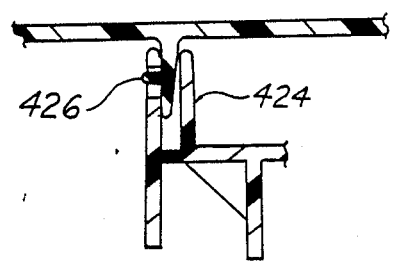
FIG. 28 is a sectional view taken in the direction of arrows 28—28 in FIG. 26, with additional detail.

The track is a one-piece molded plastic member 422 which fits against the inside of the top wall of holding tank 104 capturing the valve blade. The track member has five integral posts 424 which have snap fit attachment to a corresponding pattern of mating projections 426 integrally formed to project downwardly from the top of the holding tank. Representative detail of a connection is shown in FIG. 28.

The track member itself has an arcuate configuration comprising two separate arcuate tracks 430, 432 for supporting the valve blade. Track 430 lies on a larger radius to axis 222, and track 432 on a smaller one. The tracks comprise upwardly facing horizontal track surfaces on which the far arcuate edge portion 434 and a smaller radius portion 436 of the blade are supported. The two tracks are disposed on opposite sides of opening 188 and are spanned by four integral ribs 440 spaced apart along the tracks but not interfering with passage through opening 188.

Figure 29:
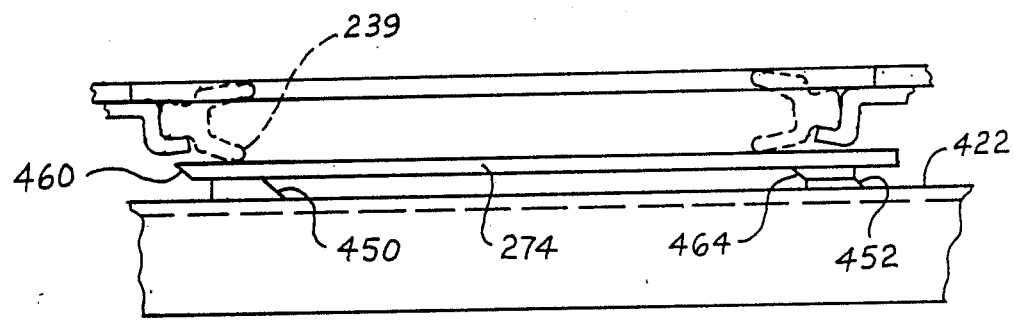
FIG. 29 is a vertical view taken in the same direction as FIG. 27 but showing assembly relationship.

An advantageous feature is incorporated into the valve mechanism such that as the valve approaches fully closed position, it is elevated slightly so that it comes into a more forceful contact with the sealing lip 239. This feature insures proper deflection of the lip for sealing purposes when the valve is closed but without unduly restricting valve motion when the blade is away from fully closed position. This elevating capability is provided by four ramps on the track member which are operative in unison with four ramps on the blade so that the blade remains essentially horizontal at all times. In other words the blade is not tipped out of the desired parallelism with the lip of the seal as the blade is swung closed, but rather is uniformly elevated. The ramps are disposed in particular locations on each track and the underside of the blade and their slopes are correlated with their radial distance from axis 222 so that blade parallelism is maintained as the ramps interact. Thus the two ramps 450 and 452 on track 430 are longer but of lesser slope than the ramps 454, 456 on track 432 which are shorter but of steeper slope. The blade has ramps 460, 462 on its leading edge margin 458 which interact with track ramps 450 and 454, and ramps 464, 466 which interact with track ramps 452, 456. Each blade ramp has a slope and length corresponding to the particular track ramp with which it interacts. FIG. 29 shows the blade closed with the several ramps having interacted to elevate it as it was being closed. Leading edge margin 458 is chamfered at 467 to provide gradual seal lip deflection as the blade is being closed. Hole 397 and member 376 are shaped to allow the blade to move axially on portion 399 as the blade elevates during closure and lowers during opening. Notch 395 provides clearance to the post 424 at the end of track 432 when the blade is fully open.

Figure 30:
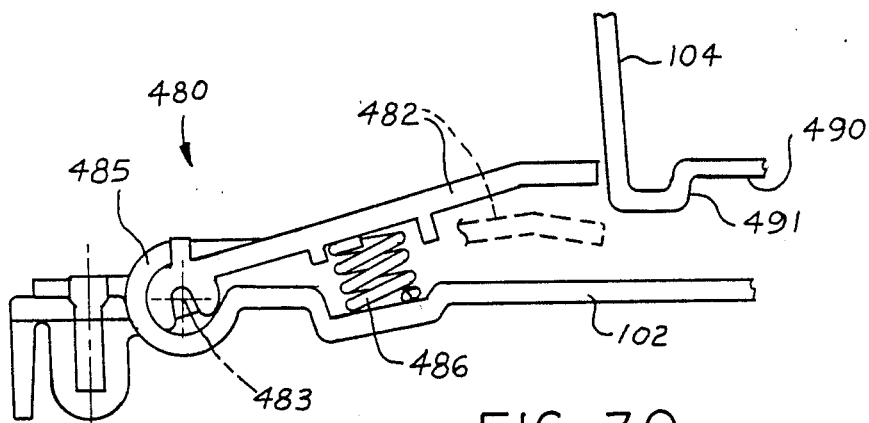
FIG. 30 is an enlarged view of circle 30 of FIG. 4.
Figure 31:
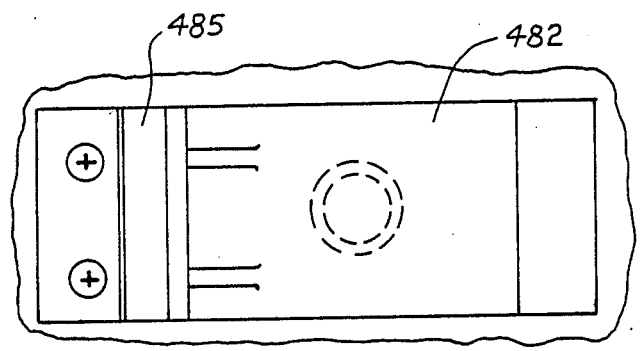
FIG. 31 is a top horizontal plan view of FIG. 30.

From the standpoint of general mechanical principles it will be appreciated that the weight of the tank on base 102 and the tank's operative connection to the bench will present to a certain extent some resistance to withdrawal of the tank. However this resistance should be minimized to enable the tank to be withdrawn without undue difficulty when it is intended to be removed. In the recreational vehicle the tank will be subjected to various forces associated with use of the recreational vehicle such as over-the-road vibrations and the like. There is ample constraint in the fore and aft direction in the RV by virtue of the support of the tracks; the connection of the tank to the bench and its support on the tracks provides vertical constraint. Consequently it is desirable to provide some form of constraint against horizontal displacement of the tank, particularly in the direction in which the tank moves out of the stowage compartment. The horizontal longitudinal constraint for the stowed position is provided by a pair of releasable spring-loaded catches 480, 481 disposed on base 102 at opposite ends of holding tank 104. FIG. 4 shows the spring-loaded catches in position which constrains the holding tank against the movement in the direction of arrow 128. The catches act against the lower end edge corners of the holding tank wall. Details of the catch mechanism are portrayed in FIGS. 30 and 31.

Base 102 is configured for mounting of the catches. Each catch member 482 can rock about a horizontal axis 483 which is perpendicular to the direction of tank removal and installation. The catch member 482 is captured for limited motion about axis 483 by a suitably shaped retainer 485 which has a cooperative association with both the catch receiving formation in base 102 and catch member 482. A helical spring 486 is compressed between a seat in the base and a seat in the underside of the catch member and serves to bias the catch member to the solid line position shown in FIG. 30 where the distal end of the catch is catching the holding tank. Depression of the catch member to the broken line position clears it from catching relation to the holding tank allowing the holding tank to be withdrawn. The distal end of the catch member is canted downwardly at an angle to improve the clearance when it is intended to remove the tank.

In order to remove the tank from the stowage compartment the catch 480 immediately adjacent the stowage compartment door is first released. This is done by depressing the spring-loaded catch to clear the lower edge of the holding tank. This allows the holding tank to pass outwardly of the stowage compartment.

The invention also provides an advantageous feature involving the spring-loaded catches which prevents the tank from being accidentally pulled completely out of the stowage compartment. Such accidental separation could result in the tank dropping onto the ground and potential damage or other undesired consequences. To guard against this the bottom wall of holding tank 104 is configured with a pocket 490 which has a sufficient height that once the tank has been withdrawn a certain amount the spring-loaded catch returns to catching position. The pocket terminates short of both ends of the tank to form stops 491.

Figure 31A:
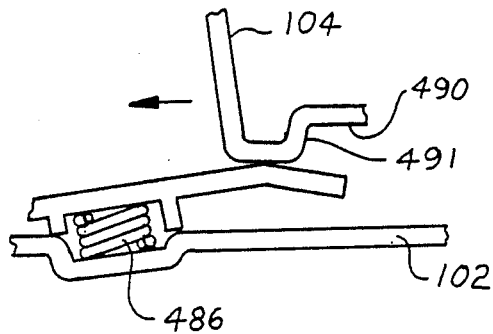
FIGS. 31A and 31B are diagrammatic views portraying different operational positions relevant to FIGS. 30 and 31.
Figure 31B:
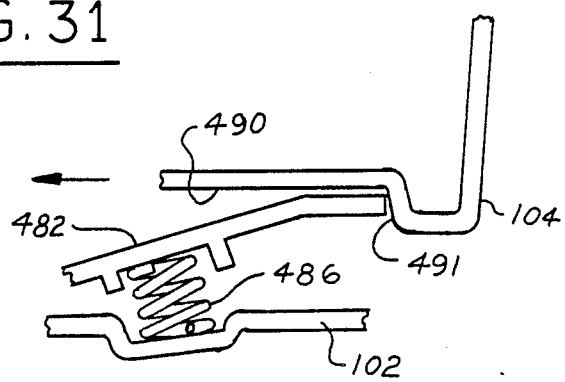

FIG. 31A shows the initial withdrawal of the tank with the near end of the bottom wall holding the previously released catch depressed. As pocket 490 passes over the catch, the spring returns the catch to catching position. Now the far stop 491 will abut the catch before the tank has been fully withdrawn arresting the outward motion of the tank. This is shown in FIG. 31B.

At this time members 230 and 232 have separated and the central top domed area of the tank has cleared the flange member 230 sufficiently that the tank can be tipped in the manner portrayed in FIGS. 8 and 9 to clear the stop of the catch. Consequently the tank can be grasped in the manner portrayed in FIG. 9 and completely removed from the stowage compartment.

Reinstallation is accomplished in the opposite manner. The empty tank will weight considerably less than a nearly full one, and therefore the clearance which is provided by pocket 490 prevents the catch from possibly cocking the tank and potential interference with members 230 and 323 coming into engagement with each other. Once members 230, 232 are initially engaged however, the near end of the tank will ride over the catch and depress it. The final installed position is defined by abutment of the far end of the tank with the far catch and at this time the near end of the tank has just cleared the near catch so that the near catch now returns into catching engagement with the holding tank with the result that the holding tank is now constrained against any longitudinal displacement by the two catches. Hence the catches may be said to define the stowage position of the tank wherein the bowl outlet is connected in sealed relationship to the tank inlet opening 188 and the actuating and actuated member 290, 292 are operatively connected together so that the valve blade can be operated from the knob 172. The relationships and constructions involved are advantageous because the one-piece base member contains locators for mounting of the catches and the one-piece base member in turn attaches to the bench thereby relating the bench to the base to define the stowage compartment and the stowed position for the holding tank therein.

Pourspout 210 and vent valve assembly 218 have a cooperative association on the holding tank not only with respect to interchangeability but also the manner in which this interchangeability is accomplished and their functioning when contents of the tank are to be emptied.

Pourspout 210 is a hollow tubular element having a right angle bend. One end is operatively engaged with the holding tank while the opposite end is closed by the removable cap 214. Details of the spout construction can be seen in FIGS. 32 and 33.

The end of the pourspout on which cap 214 is disposed is provided with an integrally formed screw thread, and the cap has a similar thread which allows it to be screwed onto the end of the pourspout to close it.

When the contents are to be dumped the cap is unscrewed and removed. Preferably a circular sealing gasket 500 is lodged within cap 214 so as to provide a seal between the end wall of the cap and the edge of the spout at its discharge end when the cap is fully tightened.

The opposite end of the spout is of a generally circular shape but it comprises a multi-lobed key 512. Specifically the key 512 comprises six circumferentially spaced lobes which are identified by the reference numerals 512a, 512b, 512c, 512d, 512e, and 512f. It also comprises a circular groove 514 adjacent to key 512 for an O-ring gasket seal 516.

Figure 34:
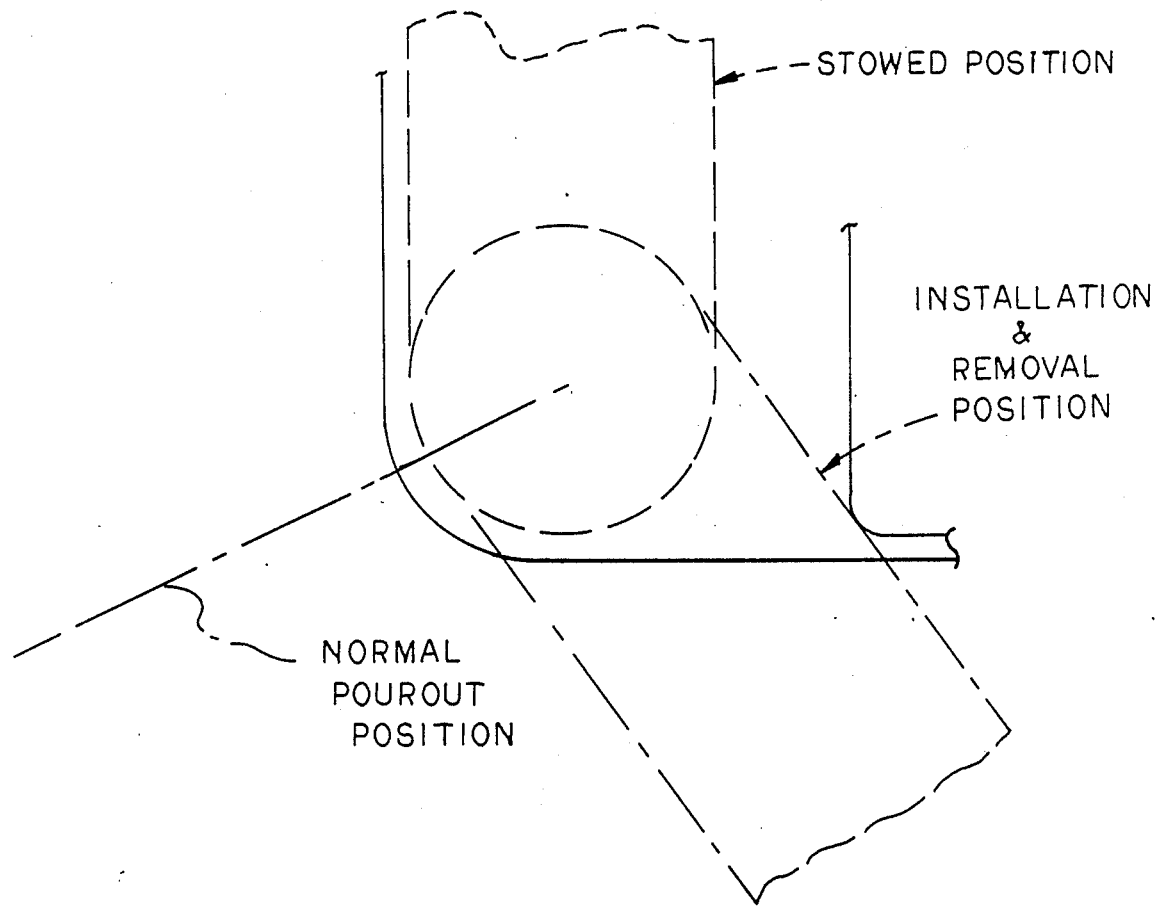
FIG. 34 is a top plan diagrammatic view illustrating different positions of operation relevant to FIGS. 32 and 33.

The holding tank hole 212 within which the keyed end of the pourspout is disposed has a complementary mating key 518 (shown in phantom in FIG. 33) disposed on the wall of hole 212. Key 518 allows the pourspout to be fully inserted into hole 212 only when the two keys are in circumferential registry. The arrangement of key 518 on the holding tank is such that circumferential registry of the two keys occurs only with the spout in the installation and removal position shown in FIG. 34.

The construction of the two keys is such that when the pourspout is fully inserted into hole 212 the key 512 is disposed just beyond the key 518. At this point the O-ring gasket 516 is engaged with the wall of the aperture so that a leakproof joint is thereby provided. As the spout is rotated from its installation and removal position, key 512 leaves its circumferential registry with key 518 but certain portions of the individual lobes of the keys are always in interlocking engagement with prevents the pourspout from coming out of the aperture. The dimensional relationships are such that this is true over all positions of the pourspout about hole 212 between its installation and removal position and its stowed position.

Figure 37:
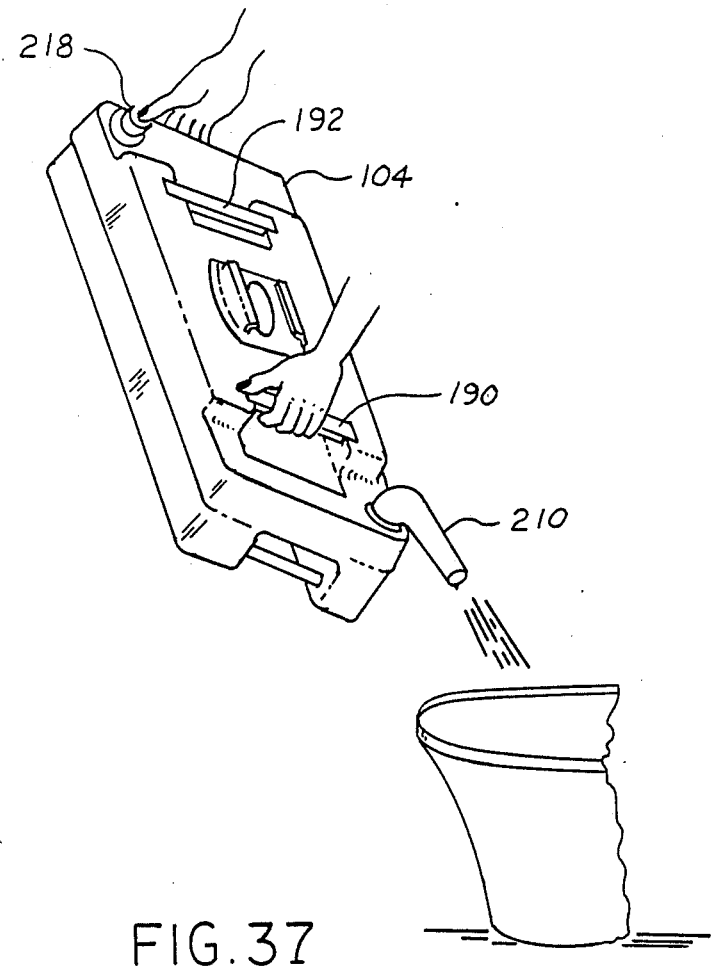
FIG. 37 is an enlarged fragmentary view illustrating certain relationships relevant to FIGS. 35 and 36.

For dumping of the holding tank to an appropriate sanitary disposal station, the pourspout is swung away from its stowed position and cap 214 is removed. The pourspout is typically pointed away from the holding tank and will not normally come close to the installation-removal position. In other words rotation to the installation-removal position would be contrary to the objective of dumping the tank, and therefore accidental separation of the spout from the holding tank is essentially impossible. FIG. 37 illustrates a typical dumpingg procedure and in that procedure the pourspout has been rotated from its storage position only about 135° or so.

Vent valve assembly 218 promotes a reasonably smooth discharge flow of the waste contents through the spout during dumping. Venting lessens greatly the tendency for belching or burping of discharging waste materials.

Details of the vent valve assembly can be seen in FIGS. 35 and 36. The assembly comprises a main body, or fitting 520, which has a keyed connection to hole 216 exactly like the keyed connection of the pourspout to hole 212. In other words hole 216 has a key which is arranged on its corner of the tank top wall in the same relative orientation as key of hole 212 has to its corner of the tank top wall. A tab (not shown) which projects from one of the keys of the fitting forms a circumferential locator for the fitting after the fitting has been inserted into the hole in the installation-removal position and turned a certain amount. Fitting 520 is fashiond with an integral circular boss 522, the lower portion of which projects into the interior of the holding tank. The boss has a top wall 524 with a recess 526 formed centrally therein. Recess 526, at the bottom, comprises a circular hole 528 concentric with the boss. Four arcuate vent openings 530 are in wall 524 extending around recess 526 on a common circle. Openings 530 provide, via the interior bore of boss 522, venting of the tank interior to atmosphere.

A valving element 532 comprises a bifurcated shank 534 which fits closely within hole 528. A circular actuator button 536 is at the top of shank 534 and a helical spring 538 is disposed around shank 534 and between the bottom wall of recess 526 and actuator button 536. The spring 538 biases the valving element 532 in the upward direction so as to urge a suitable closure portion 540 against the lower circular edge of boss 522, so as to close the interior bore of the boss and hence the vent openings 530. The illustrated construction for the closure portion comprises a rigid circular portion 542 which is affixed to the lower end of shank 534 within the holding tank and which supports an annular gasket 544 which seals against the lower circular edge of the boss 522 when the valve is closed.

The broken line position shown in FIG. 35 thus represents the closed position to which the valving element is normally spring biased. In this position the closure portion prevents waste materials and vapors from passing through the vent openings. The solid line position illustrates the actuated position which is used during dumping to vent the interior headspace of the holding tank. It should be observed that a stop 546 is provided on button 536 for limiting downward displacement so that the button does not close off the vent openings when the valve is depressed. Thus, actuation of the valve always allows air to pass through the openings 530 into the holding tank to prevent the creation of the partial vacuums which might give rise to belching and burping during dumping.

It will be further observed that the location of the vent valve assembly is adjacent to the handle 196 and a finger recess 200a in cavity 200. As can be appreciated from consideration of FIG. 37 the handle or finger recess may be grasped by a person dumping the holding tank. The configuration is such that the person's fingers fit conveniently onto the handle or finger recess with the actuator button being poised to be pushed by the thumb to the venting position. An upstanding lip 550 extends partially around (somewhat more than a semicircle) the outside of the top wall of boss 522. The upper edge of lip 550 is above button 536 when the valve is closed and it forms a protector against inadvertent actuation of the valve. It also assists in preventing thumb slippage while the button is being depressed. Thus function and convenience are greatly promoted by the arrangement. The keyed mounting and locator stop serve to properly orient lip 550 for thumb access in this way.

Because the vent is located generally opposite the pourspout it will inherently be exposed to the headspace of the tank during dumping, the tank being designed to leave a headspace when its liquid waste content is completely full. Accordingly, liquid waste will not accidentally pass through openings 530.

Figure 38:
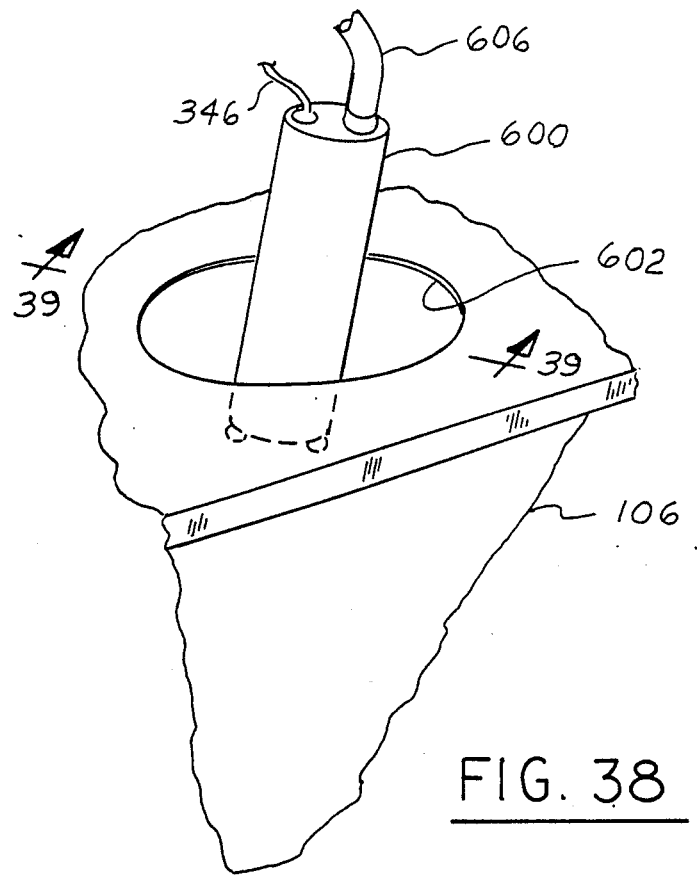
FIG. 38 is a fragmentary perspective view illustrating installation of an electrically operated pump.
Figure 39:
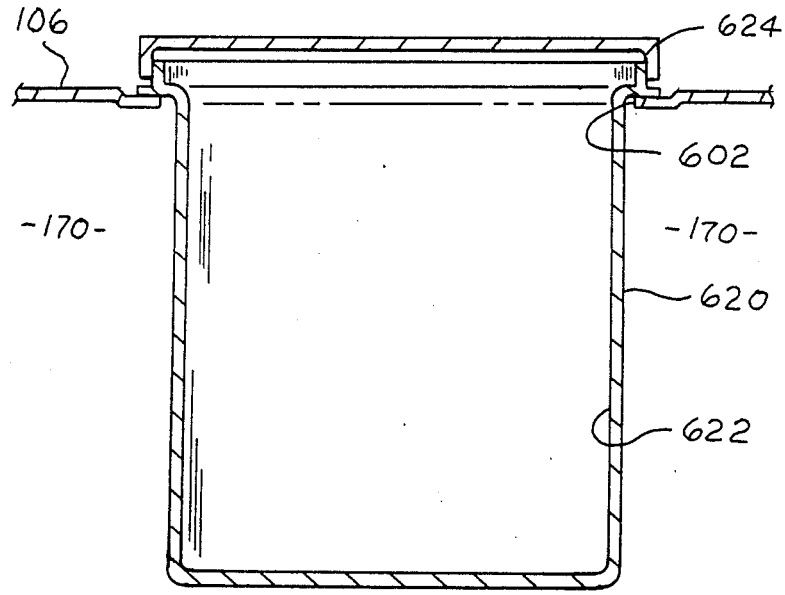
FIG. 39 is a vertical sectional view taken in the direction of arrows 39—39 in FIG. 38.

In connection with the earlier description of the operation of knob 172 it was explained that the knob controls an electrically operated pump when the toilet is to be of the electrically operated pump type. FIG. 38 is a fragmentary view illustrating installation of such a pump 600 through an opening 602 which is provided in the top wall of bench 106, the two halves of the bench having been previously joined together around their common seam. Opening 602 is to the side of the seat opposite knob 172 and is sufficiently large to pass a small electrically operated pump of the submersible type. The pump inlet fits down into a pocket 604 of chamber 170 toward the front of the bowl as can be seen in FIG. 5. This is essentially the low point of chamber 170 so that pump 600 will be effective in use to pump essentially all the water out of the chamber.

The pump outlet connects through a flexible conduit 606 to a discharge opening or nozzle 608 in the sidewall of the toilet bowl. (See FIG. 5) When the pump is operated, water from chamber 170 is pumped through conduit 606 and into the bowl. Preferably it is directed around a circular ledge 612 integrally formed in the bowl, spilling over the edge of the ledge to thoroughly rinse the full extent of the bowl.

The space in the vicinity of where the conduit from the pump connects to the bowl (i.e. the top to the left of the seat) is ostensibly available for water storage. But the overall configuration results in a shape where a trapped air pocket may be formed. Although full level will typically be below the point at which the conduit connects to the bowl, the potential for such an air pocket is created if the full extent of this space is attempted to be used. The presence of such an air pocket will resist filling because of the trapped air, and this in turn reduces the water storage capacity of the chamber even though a space is present which could accept additional water.

A still further aspect of the present invention comprises providing a vent 610 from this air pocket to the interior of the bowl. In the disclosed embodiment this vent is provided near where the conduit from the pump connects to the bowl. This is a somewhat sheltered location so that passage of water through the vent into the bowl is improbable, but if there should be any such intrusion, the water will fall into the bowl and therefore not escape from the sanitary fixture.

Figure 40:
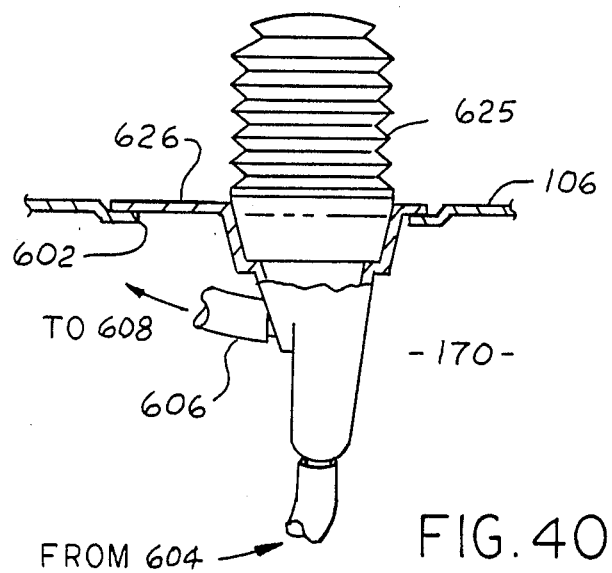
FIG. 40 is a view similar to FIG. 39 illustrating a modified form.

After the pump has been installed, it is necessary to close opening 602. A convenient type of a closure contains a provision for storing a product which may be used in association with the sanitary fixture. In the disclosed embodiment opening 602 is closed by a member 620 comprising a circular cylindrical receptacle 622 and fitting through the opening 602 into the interior of the water storage chamber. The top of receptacle 622 is open so that it can receive and contain a fresh full roll of toilet tissue. The closure is attached by any suitable means to the top of the opening in a sealed manner. A circular cover 624 fits onto the top of the receptacle to close it.

Where the pump is of a manually operated type, the opening serves to mount a manually operated pump such as one of the type disclosed in U.S. Pat. No. 4,180,876, commonly assigned. A pump 625 is mounted on a fitting 626 which closes opening 602 and the pump inlet extends down into the same pocket 604 of the tank where the inlet to the electrically operated pump was located in the electric pump version. A conduit from the pump outlet connects to the bowl in the same manner as was described for the electric pump version. See FIG. 40 for the manual pump.

FIGS. 41–48 portray further detail related to fill 220. The fill comprises a translucent plastic bottle 650 having the shape illustrated in FIGS. 41 and 42. The bottle is mounted by a hinge structure for hinging motion about a vertical axis 652. In the stowed position portrayed in FIG. 6 the fill bottle is entirely within stowage compartment 108 so that the RV access opening can be closed by the access opening door.

When the fill is to be used, the access door is opened and the fill bottle swung about vertical axis 652 essentially 90°. This disposes a circular opening 654 in the top wall of the bottle outside of the RV sidewall where it can be filled from any suitable source of water, usually a hose, after the cap 656 on opening 654 has been opened. Bottle 650 has a horizontal outlet nipple 658 near its bottom to which one end of a conduit 660 is connected. This conduit has a shape and a configuration compatible with the hinged motion of the bottle between stowed and fill positions and it extends in the stowage compartment to connect to an integral nipple 662 formed in the bench. This point of connection is below the full fill level of the water storage chamber, and it lies on plane 224.

One of the features of the invention comprises fill bottle 650 being disposed at a vertical elevation which is correlated with the full fill level of water storage chamber 170. Specifically the fill bottle is disposed at a vertical elevation such that the vertical dimension of the fill bottle spans the same vertical elevation as a final range of filling of chamber 170 up to full. The translucent plastic fill bottle contains two series of graduations 664 correlated with this range on opposite sides.

Conduit 660 extends from the fill bottle to its connection to water storage chamber 170 along elevations which are below the full fill level. Hence filling of the chamber occurs by the principle that water seeks its own level. This arrangement is especially advantageous in that it promotes compactness yet provides a capability for convenient filling to a desired fill level.

The size of the fill bottle and conduit are sufficient that water will readily flow from the fill bottle through the conduit and into the chamber. Therefore as the level in the storage chamber approaches the final range of filling with which the graduations are correlated, the level in the fill bottle will essentially correspond to the level in the chamber. By observing the level in the bottle in relation to the graduations, the person servicing the fill can observe when the tank has been filled full. Upon filling of the chamber, cap 656 is placed back onto the fill bottle opening and the fill bottle is returned to its stowed position. FIGS. 44–47 illustrate details of certain of the component parts for the hinge mounting of the bottle. These parts include a mounting bracket 670 which has a flange 672 which is disposed against and attached to the bench at a downwardly facing horizontal wall portion of the bench at cavity 176. Hinge bracket 670 serves to hingedly mount an intermediate connector member 674 which makes connection onto the end of the bottle opposite the fill opening.

Figure 41:
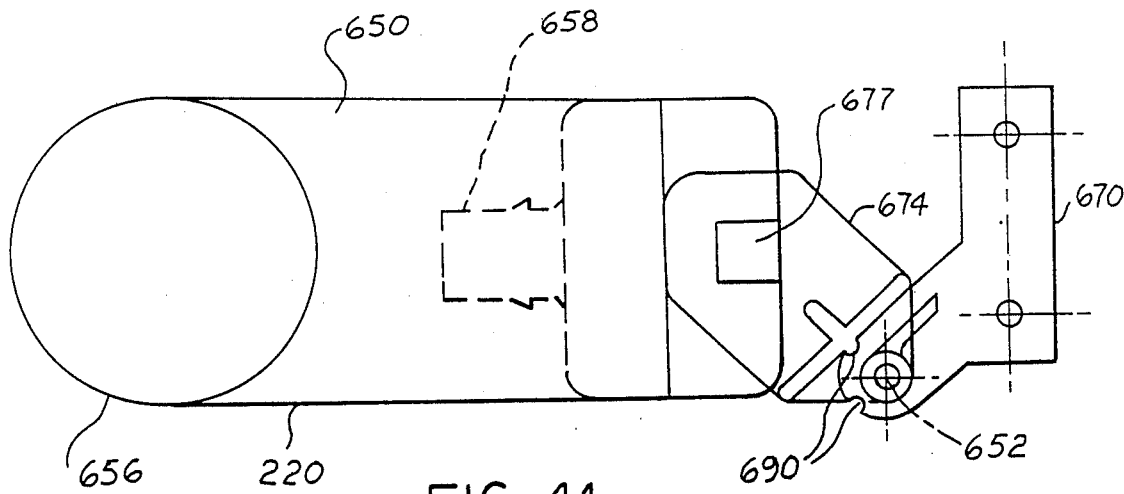
FIG. 41 is an enlarged fragmentary top plan view taken in the direction of arrows 41—41 in FIG. 6.
Figure 43:
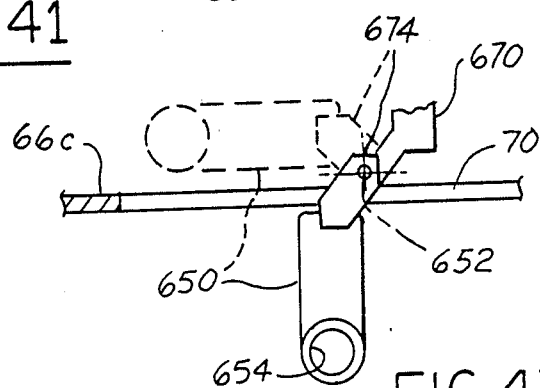
FIG. 43 is a diagrammatic view illustrating a different position for the component shown in FIG. 41.
Figure 42:
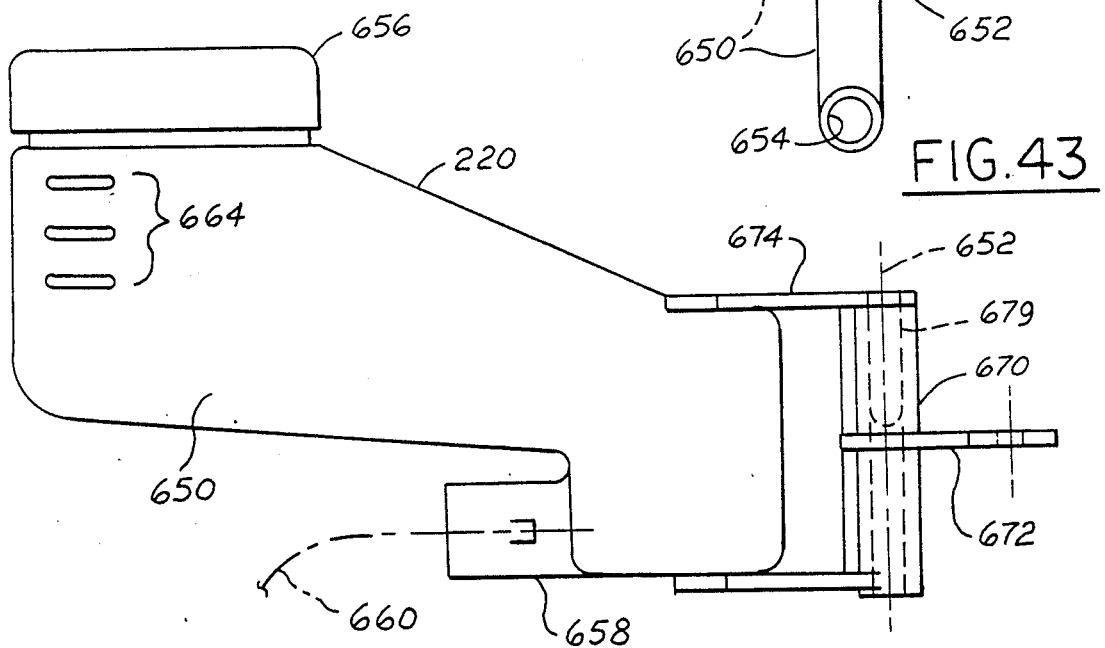
FIG. 42 is a front elevational view of FIG. 41.
Figure 45:
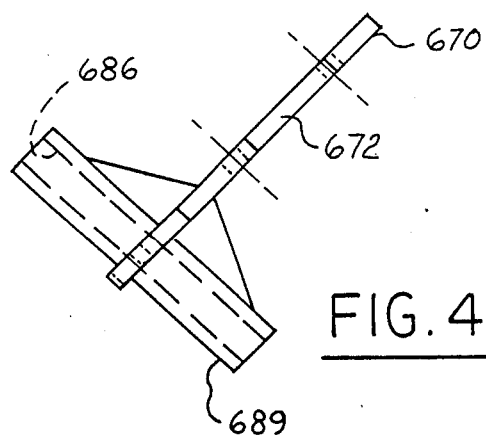
FIG. 45 is a view taken in the direction of arrows 45—45 in FIG. 44.
Figure 44:
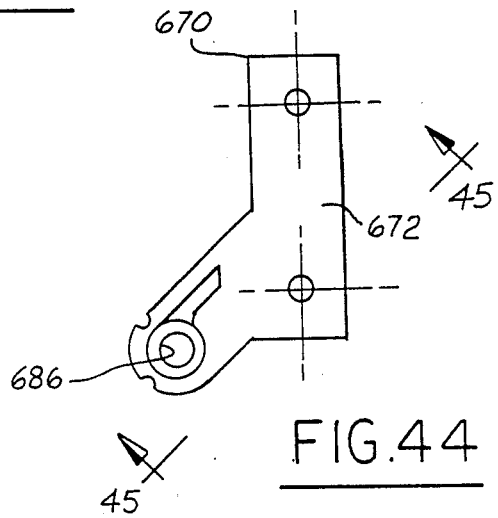
FIG. 44 is a top plan view of one of the component parts of FIGS. 41 and 42 shown by itself.
Figure 47:
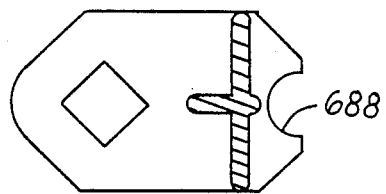
FIG. 47 is a horizontal sectional view taken in the direction of arrows 47—47 in FIG. 46.
Figure 48:
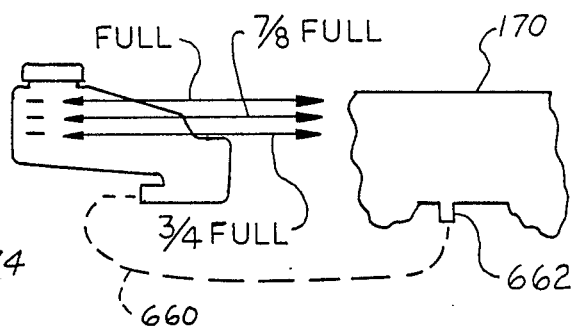
FIG. 48 is a diagrammatic view illustrating relationships of FIGS. 41 and 42 to other components of the system.
Figure 46:
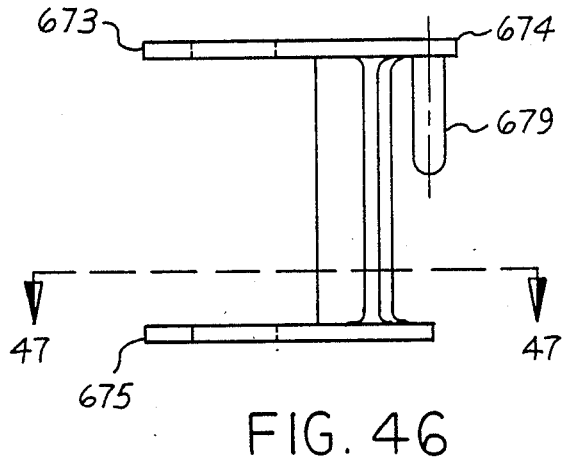
FIG. 46 is a vertical view of another of the component parts of FIGS. 41 and 42 shown by itself.

Part 674 has vertically spaced apart horizontal arms 673, 675 forming a throat which fits onto the end of the bottle by a snap-on type of attachment. The bottle is formed with vertically aligned square pads 677, and each arm 673, 675 contains a square hole via which the part snaps onto the corresponding bottle pad 677. FIGS. 41 and 42 illustrate a right hand installation. The arrangement is advantageous in that the parts provide for a reversal in mounting of the fill bottle when the fill bottle is used in a left hand system installation. In such an installation part 670 is essentially turned upside down because the opposite cavity 178 is the mirror image of cavity 176. For a left hand installation part 674 is indexed 90° so that in the left hand installation the part 674 will appear as a mirror image of the position shown in FIG. 41. As a result bottle 650 is in the mirror image position for such a left hand installation. Although the pourspout, which is below the fill, does not have mirror image symmetry like the bottle, there is still ample clearance between the fill and its associated parts and the pourspout.

Part 674 is configured to allow it to lift onto and off of part 670. For this purpose upper arm 673 has a downwardly projecting pin 679 which fits into a circular hole 686 in part 670. The lower arm 675 has a circularly contoured edge 688 which bears against the outside circular wall 689 of part 670. A detent arrangement 690 is provided to define the stowed and fill positions respectively.

Although the usual intent is to completely use the water in water storage chamber 170 by passing it through the toilet bowl outlet and into the tank, there may be times when it is desired to drain the chamber by other means, and a still further aspect of the invention provides this capability. It does so by enabling this draining to take place through the stowage compartment to outside the RV.

The bench contains a drain nipple 680 centrally located at the low point near the front of the bowl (see FIG. 5). A flexible drain conduit 682 is fitted onto this nipple and routed through the stowage compartment to a location of adjacency to the RV's sidewall access opening. The end of the drain conduit is preferably closed by a removable plug 684 which provides a leakproof closure but is relatively easily removable when the chamber is to be drained. The drain conduit has sufficient length allowing it to be extended through the access opening to outside the RV where this plug 684 can then be removed allowing the contents of the tank to drain. Because the tank is vented to atmosphere through the vent to the bowl, unplugging of the drain conduit will cause the tank to drain through the extended conduit. After draining, the plug is reinserted and the conduit stowed.

The conduit 660 from the fill bottle to the chamber 170 contains a low point and therefore draining of the tank via drain conduit 682 may not necessarily drain fill bottle 220 and the conduit 660. However because the fill bottle can be conveniently lifted off of its hinge mounting it can be so removed, uncapped, and placed at a sufficiently low elevation allowing the conduit and the fill bottle to drain to outside.

Figure 50:
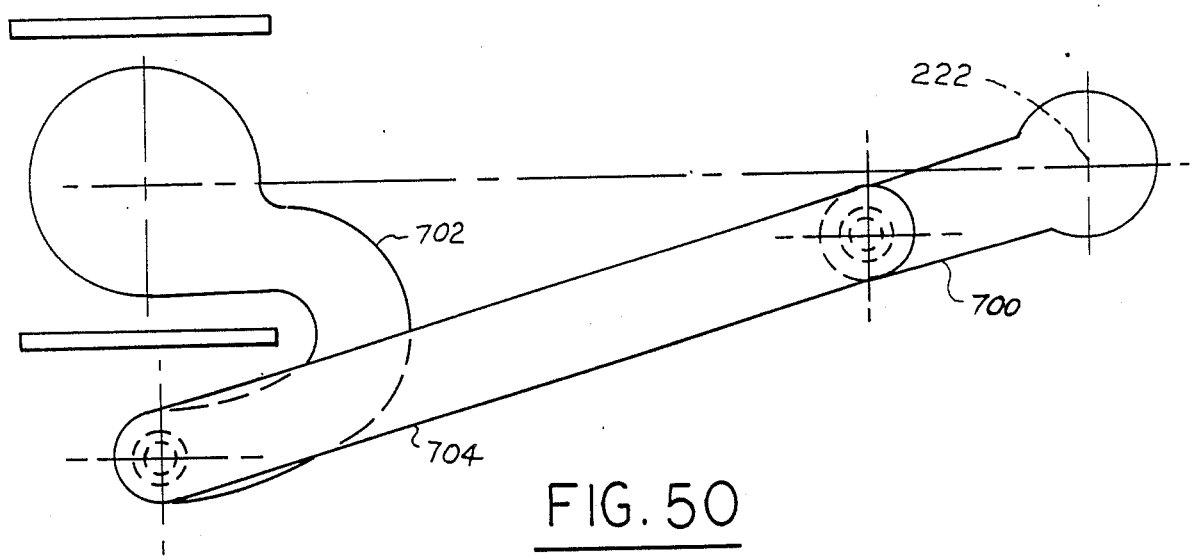
FIGS. 49, 50, and 51 are views of a modified form for certain parts of the system.
Figure 49:
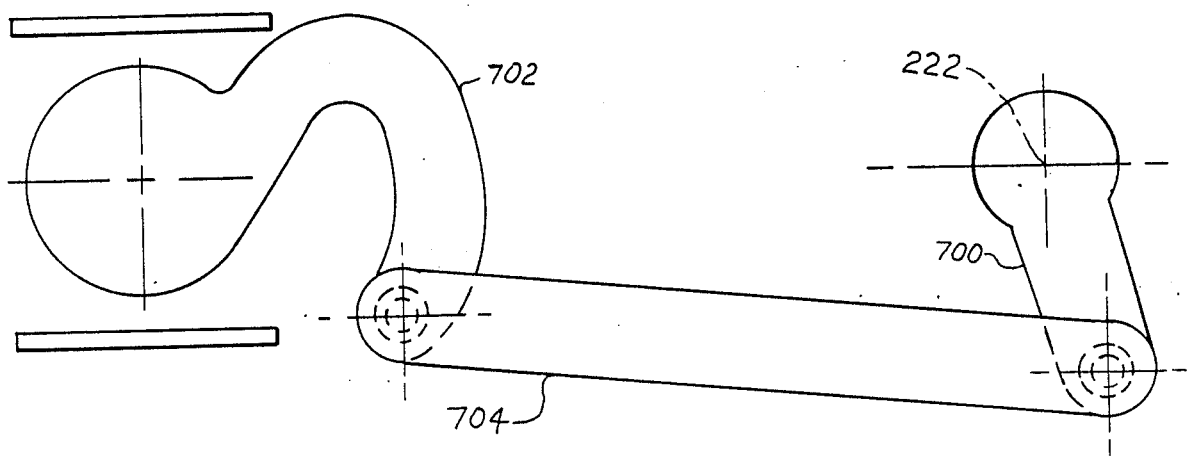
Figure 51:
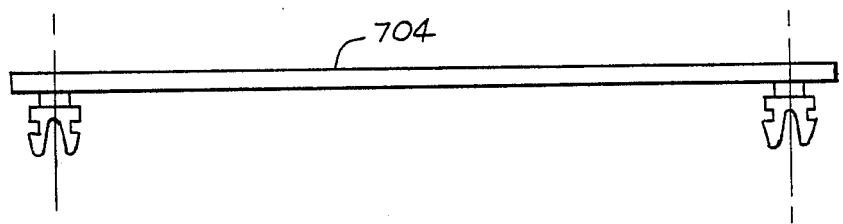
Figure 53:
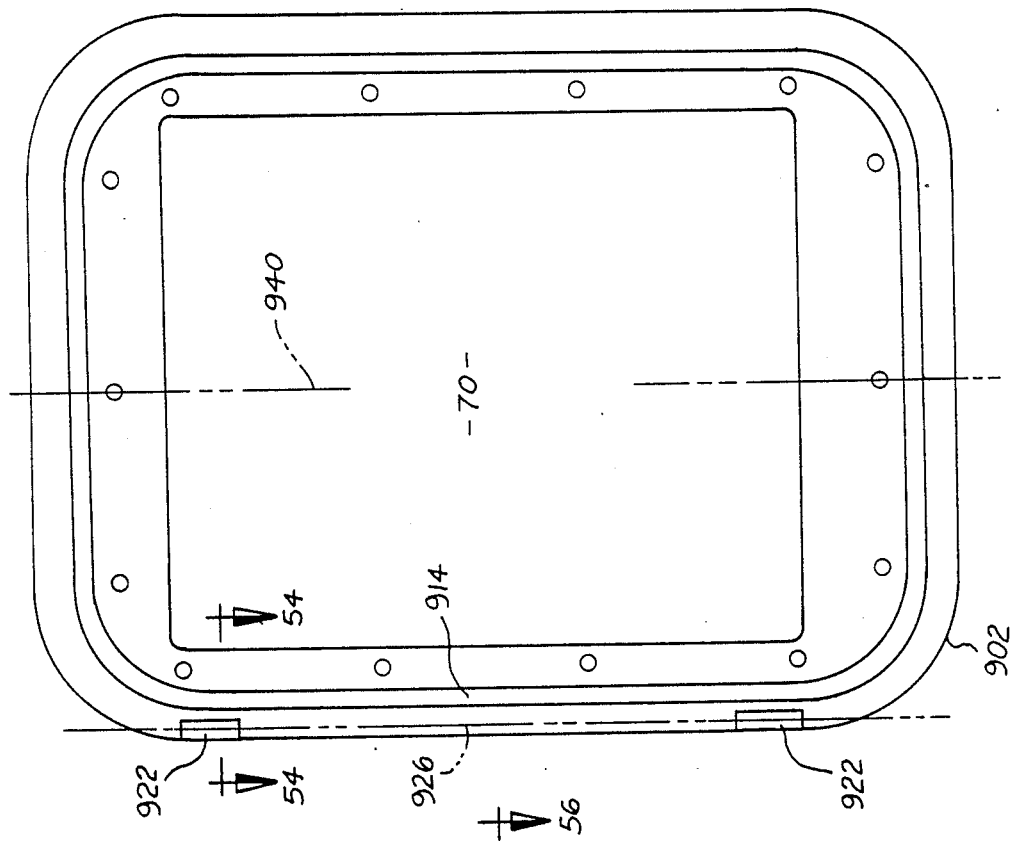
FIGS. 52 and 53 are elevational views of two parts, by themselves.
Figure 52:
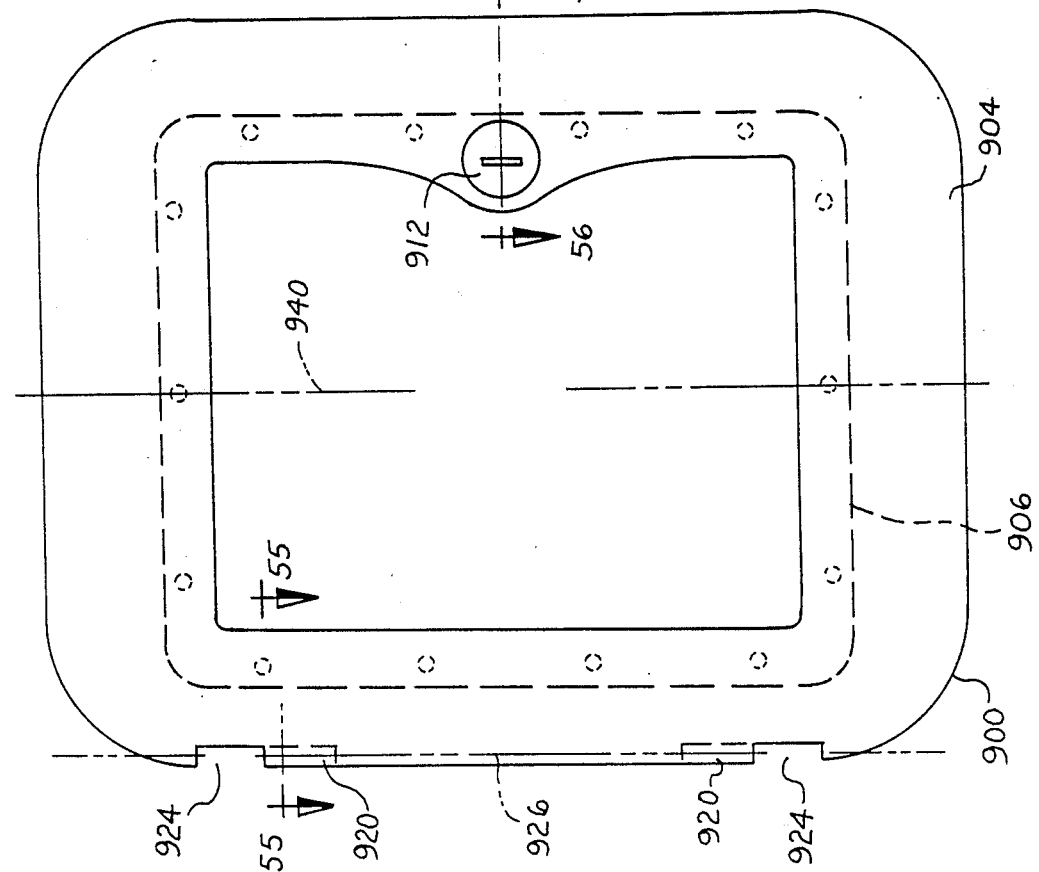
Figure 54:
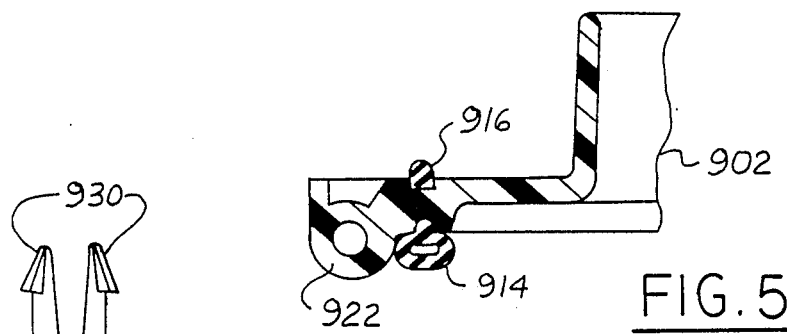
FIG. 54 is a horizontal cross section referenced to FIG. 53.

FIGS. 49, 50, and 51 illustrate an alternate form of coupling mechanism for the actuator. Essentially this mechanism is in substitution of the chain and sprockets of the aforedescribed mechanism. This alternate form comprises a drive crank 700 in substitution of sprocket 326 and a driven crank 702 in substitution of sprocket 334. A link 704 between the two cranks substitutes for the endless chain.

FIG. 49 shows the position of the mechanism when knob 172 is operating blade 274 to the full open position. FIG. 50 illustrates the position of the mechanism when the knob is operating the blade to the fully closed position.

As can be seen in these drawing figures the cranks are shaped with suitable clearance to adjacent parts.

The mechanism shown in FIGS. 49-51 comprises a variable mechanical advantage, unlike the chain and sprocket mechanism which has a constant mechanical advantage. Drive crank 700 and link 704 in effect form a toggle which acts on driven crank 702. The nature of the toggle is such that the maximum force is developed in the toggle just as the blade is being operated to the fully closed position. In the context of the aforedescribed structure which elevates the valve blade as the valve blade approaches fully closed position, thereby more forcefully deflecting seal lip 239 as the valve comes to fully closed position, the toggle is especially advantageous because it provides a maximum mechanical advantage just at the time that the maximum mechanical advantage is most useful, i.e. at the time of blade elevation on the ramp and increased seal deflection. When the valve is operated from the closed position, the same maximum mechanical advantage will be applied with the toggle serving to break away from the closed position. Thereafter, when less effort is required to move the valve blade because it is in less forceful engagement with the seal as it approaches open position, the lower mechanical advantage is entirely satisfactory. Indeed the feel of operation of this type of mechanism is considered to be quite desirable.

As an aid to fabrication and assembly the cranks and link are fabricated out of suitable plastic parts for requisite strength and dimensional stability but without separate attaching parts by providing snap-type connections at the ends of the link which snap into holes in the two cranks.

The invention in its several aspects possesses novel and unique features which have heretofore not been available in self-contained sanitary systems, particularly for recreational vehicles. Access for the usual servicing of the sanitary fixtures is performed entirely from the exterior of the RV through the access opening in the RV sidewall. The functions of filling of the water storage chamber in the bench, draining of that chamber, and the removal and installation of the waste holding tank are accomplished through this access opening. The organization and arrangement represents an efficient utilization of available space within a three dimensional envelope within the recreational vehicle. Satisfactory capacities, on the order of 12 to 15 gallons U.S. for example are provided for the holding tank, and a correlative amount for the water storage chamber which is usually somewhat less than the capacity of the holding tank.

Since manufacture of sanitary systems of this type is typically not within the province of RV builders, an entirely self-contained system can be shipped from the sanitary system manufacturer to the RV builder and essentially all that the RV builder has to do is provide a space in which to mount it. In other words the RV builder does not have to go to the trouble of separately mounting a toilet bowl on the floor, mounting a waste tank under the floor, connecting it to the toilet bowl outlet, or attaching the usual conduits and termination valves to the outside of the holding tank. Moreover, the stowage compartment is inherently defined in the combination of the base and bench so that all the RV builder need provide is the RV sidewall, the floor, and the interior back and sidewalls. The illustrated embodiment is adaptable for right-hand and left-hand installations. It is also adaptable for front and rear installations where the lengthwise dimension of the sanitary fixture would align with the fore and aft direction of the RV and in this instance one of the lengthwise ends of the fixture would be disposed against either the front or rear wall of the RV with a suitable access opening being provided.

Sometimes the RV builder must route service conduits such as heating ducts, electrical wires, etc.

through the space where it is desired to place the sanitary fixture. The illustrated embodiment of the invention is adapted to accommodate such a situation by providing a service conduit passage 800 for a heating duct 802 which runs fore and aft of the RV along the floor just inside the sidewall. Both longitudinal ends of base member 102 have lips 804. The near lip 804 fits against the RV sidewall just below the lower edge of the rectangular access opening, and since the base member covers the full width of the stowage compartment, the service conduit is separated from the stowage compartment. This capability is provided in part also by the particular configuration of the box frame 110 and it is contemplated that other configurations of box frame and/or base member 102 can accommodate passage of service conduits in other locations through the sanitary fixtures installation.

The pan formations in the base member provide a place for the stowage of chemical containers. These may be deodorants or the like which are introduced into the toilet holding tank. Typically these chemicals are added after the holding tank has been dumped, rinsed, and filled with a small amount of water. Therefore when the tank is brought back to the RV in such a condition, the valve can be opened and chemicals introduced. In this regard the provision of the tongue on the actuated member on the holding tank is a convenient way for manually operating the valve when the tank is out of stowage. The containers for the chemicals can then be closed and placed back into the pans in the base member, the holding tank valve also can be closed. Then the holding tank is reinstalled in the stowage compartment.

In the event that the holding tank were to be filled beyond its capacity, the organization and arrangement provides a way to alleviate such a condition. While the system preferably includes a liquid level indicator 810, 812 (FIG. 2) by which the level of waste in tank 104 is displayed at the front, failure to observe an indicated full condition may result in the holding tank being filled beyond its capacity. This refers to being filled above the level of the valve blade. As explained earlier this condition may be observed from the inside of the RV through the toilet bowl. If such a condition is seen, the access door to the stowage compartment can be opened, the pourspout rotated to a pouring position pointing out through the access opening and the closure cap on the end of the pourout spout removed.

The pourspout defines a weir level below that of the valve blade so that excess waste will flow out of the tank to bring the level to that of the weir level defined by the pourspout. This will alleviate the overfilling and then the spout can be capped in the usual manner, the tank removed and transported for dumping.

The liquid level indicator 810, 812 comprises two movements identified by the two respective reference numerals. Movement 810 is contained entirely within holding tank 104 and comprises a float arm assembly exactly like the float arm assembly described in U.S. Pat. No. 4,547,916, commonly assigned. As such, it has a magnet which is positioned along a segment of a circular arc in accordance with the level of waste in the tank.

Movement 812 is mounted on base member 102 and comprises a receptacle and indicator wheel like those in patent 4,547,916. The wheel is journaled in the receptacle and comprises a visible indicator portion which is viewable through a front window. There is a suitable recess 814 provided in bench 106 for the movement 812 when the bench and base are assembled together. The wheel contains a magnet which, when the holding tank is stowed, is magnetically coupled through the wall of the tank with the magnet of the float arm assembly whereby movement 810 operates movement 812 to provide the visible level indication. The operation of the movements is like that described in patent 4,547,916.

The operative coupling between the two magnets is automatically made upon stowage of the tank within the stowage compartment and is automatically broken upon removal of the tank from the stowage compartment. Although there is a certain dimensional clearance so that the movement 812 does not interfere with insertion and removal of the holding tank into and out of the stowage compartment, the magnets have sufficient strength to bring the magnet of movement 812 into proper correlation with the position of the magnet of movement 810 so that accurate level indication is achieved for the stowed holding tank.

Door 72 and opening 70 have unique frames 900 and 902 respectively. Details appear in FIGS. 52-57.

The door frame 900 comprises two molded plastic outer and inner parts 904, 906 which sandwich the margin of a door member 908. The parts 904, 906 are held together by a series of fasteners 910 which are passed through apertures in the inner frame part 906 and into a matching pattern of receptacles on the inside of outer frame part 904 so that the attachment is not visible from the outer face of the door. The midpoint of the right side of door frame 900 contains a key-operated latch 912 for latching the closed door to the frame opening. Frame 902 attaches to the RV sidewall 66c by a series of fasteners 913. The overall size of frame 900 is slightly less than frame 902 so that when the door is closed, frame 902 is almost entirely concealed by the door when looking straight toward the outer face of the closed door.

A peripheral seal 914 on the outer face of frame 902 seals against the door, when closed, completely around the opening 70. A second peripheral seal 916 is disposed on frame 902 behind seal 914 to completely seal frame 902 to sidewall 66c around opening 70. Therefore, when the door is closed, opening 70 is well sealed against intrusion by foreign substances such as water and dirt.

Each frame 900, 902 contains two integral circular cylindrical vertical hinge sockets 920, 922 respectively. In the case of frame 900, the two sockets 920 are integral with part 904. Part 904 also contains two notches 924 which closely receive sockets 922 of frame 902 in vertical alignment with sockets 920 for hinging of the left hand endge of frame 900 on the left hand edge of frame 902 about a vertical axis 926.

Figure 57:
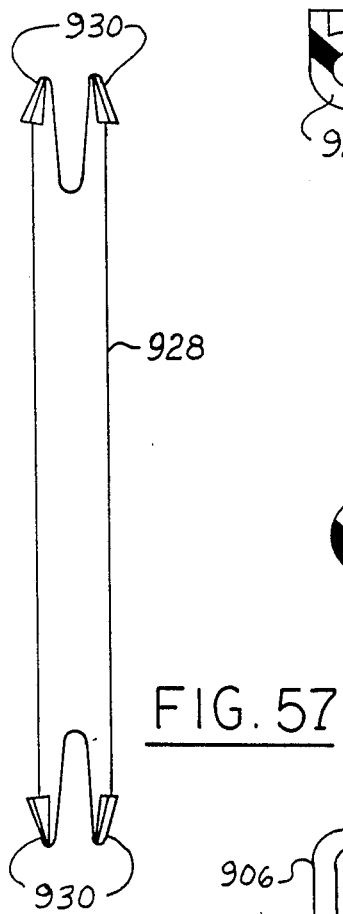
FIG. 57 is a view of a part by itself.
Figure 55:
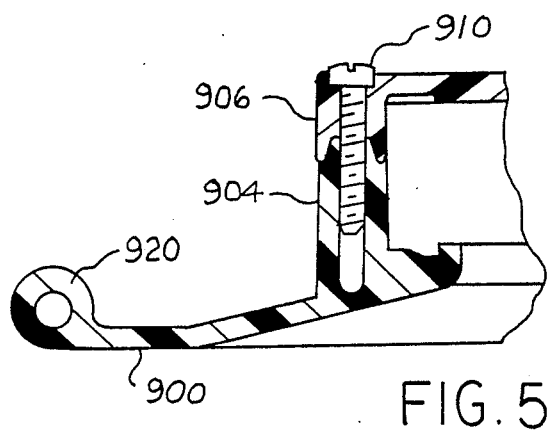
FIGS. 55 and 56, horizontal cross sections referenced to FIG. 54.
Figure 56:
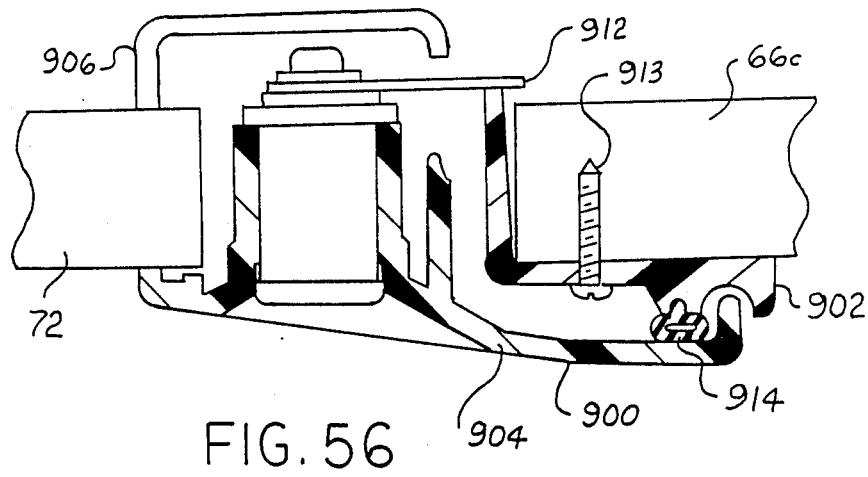

Two hinge pins, like the one 928 shown in FIG. 57, are used, one to connect the upper pair of aligned sockets 920, 922 and the other, to connect the lower pair of aligned sockets 920, 922. The hinges are essentially concealed when the door is closed, also an advantageous feature.

Assembly of the upper hinge pin 928 is done by inserting it through the upper two sockets 920, 922 and assembly of the lower hinge pin to the lower socket 920 and 922 is done in the new way. While each pin can be inserted into the aligned sockets by first inserting it through the socket 920 and then into the socket 922, the inwardly directed lip which extends around the outer margin of part 904 may be interrupted at its intersection with axis 926 so that the pins can also be inserted from the top in case of the upper two sockets 920, 922 and from the bottom in the case of the lower sockets 920, 922.

The ends of hinge pins 928 have deflectable catches 930. The catches deflect radially inwardly allowing the pins to be inserted into the sockets. The axial distance along each pin between the catches at its ends is just slightly greater than the overall length of each socket pair 920, 922 so that once a hinge pin has been fully installed, it is axially retained by its catches thereby completely the hinge joint. The hinge pins are symmetrical for insertion via either end, a convenience for assembly purposes.

The integral formation of the hinge sockets in the respective frames 900, 902 is advantageous because it eliminates the use of separate hinges, and the need to attach those hinges to the frames, and it does not interfere with the sealing of the closed door. for non-integral hinges, either sealing provisions are more complicated, or a larger cross sectional space must be devoted to the hinges and seal compared to the illustrated construction.

Suitable provision is also made as required to provide adequate clearance for operation of the key-operated cylinder latch 912.

It is also to be observed that the assembled door and frame 900 and frame 902 are symmetrical about a horizontal plane bisecting the two. Therefore in a left hand system installation they can mount on the left hand RV sidewall in mirror image fashion to the illustrated right hand installation so that the hinge axis 926 is at the rear of the opening (relative to the RV) and when viewed from outside of the RV the axis 926 will be along the right hand edge of the opening.

The assembled door and frame 900 and frame 902 also have a certain symmetry about a vertical plane 940 bisecting the two so that it is possible to mount them in a right RV sidewall with the axis 926 along the right hand edge or in a left RV sidewall with axis 926 along the left hand edge. For any type of installation, it is important to be sure that any structure inside the RV in the vicinity of opening 70 does not interfere with either the installation of the assembled door and frame 900 and frame 902 or the hinging action of the door about the hinge axis, or the latching of the door. Indeed, the hinge axis could be other than vertical.

In the completed system installation, there is no inner frame member on the inside of opening 70 nor does frame 902 protrude beyond the inside edge of the opening except for a short projection behind which the tab of the latch lodges when the door is closed and latched. Thus the interior surface of wall 66c is left flat around opening 70. Accordingly the bench and base can be disposed directly flat against the inside of wall 66c, and in an uninterrupted manner around opening 70. They also might be considered to provide some lateral support to the wall around opening 70, although frame 902 also strengthens around opening 70. This fit of the base and bench to the inside surface of the RV sidewall provides a satisfactory isolation of the stowage compartment and opening 70 from the interior occupant space, resisting intrusion of dirt, water, odors or the like.

Moreover the arrangement minimizes the difference between the size of opening 70 which is required for movement of a holding tank of given transverse cross section into and out of the stowage compartment on the one hand, and the required transverse cross section area on the interior of the RV on the other hand.

Certain aspects of the invention have particular application to a self-contained sanitary system in the form of a toilet as illustrated. Other aspects of the invention have broader application than just to toilets. While a preferred embodiment of the invention has been disclosed, it will be appreciated that principles are applicable to other embodiments.

What is claimed is:

1. In a toilet system having a seat section and a tank for water which is used with said seat section, said seat section being supported independently of said tank, the improvement comprising a base which is fixed in a position below said seat section and upon which said tank is supported for separational movement with respect to said seat section from a united position in which said seat section is in fluid communication with said tank enabling water from said seat section to enter said tank to a separated position away from said seat section, said seat section having a lower outlet opening through which said water is discharged from said seat section and said tank having an inlet opening through which said water enters said tank, said seat section outlet opening and said tank inlet opening being vertically aligned with one another in said united position when said tank is in fluid communication with said seat section, retention means for constraining said tank in said united position so as to prevent unintended movement of said tank with respect to said seat section, a valve disposed on said tank which is moveable between positions opening and closing the tank opening, said valve, when in position opening said tank opening, enabling water from said seat section to enter said tank and, when in position closing said tank opening, said valve sealing the contents of said tank within said tank, an operator accessible from said seat section for operating the valve on the tank and coupling means extending from said operator to said valve whereby said valve can be selectively opened by a toilet system user when the tank is in said united position and can be closed when the tank is in said separated position to facilitate tank transport.

2. The improvement set forth in claim 1 in which said openings when vertically aligned form a disconnectable sealed fluid coupling, and including guide means forming a guide path correlated to the direction of movement of said tank relative to said seat section for guiding said openings out of and into alignment with each other.

3. The improvement set forth in claim 2 in which said coupling means includes a separable connection which automatically connects and disconnects in accompaniment of motion of the tank to and from the united position.

4. The improvement set forth in claim 2 in which said guide path is along a horizontal straight line and said respective openings are disposed in horizontal planes and correlated with such straight line guidance so that said openings are brought into vertical alignment when said tank is in said united position.

5. The improvement set forth in claim 4 wherein said guide means is disposed about said seat section opening and about said tank opening acting over a final increment of motion of said tank to said united position to secure a precise relationship in the alignment of said openings when said tank is in said united position.

6. The improvement set forth in claim 5 in which said guide means comprises a first guide portion about said seat section opening and a second guide portion about said tank opening, said guide portions coacting to secure said precise relationship in the alignment of said openings in both a horizontal lateral sense and in a vertical sense when the tank is in the united position.

7. The improvement set forth in claim 6 in which said guide means comprises two leads, the first of which acts in the horizontal lateral sense and the second of which acts in the vertical sense, for initial guidance of said second guide portion onto said first guide portion as said tank approaches said united position.

8. The improvement set forth in claim 5 in which an annular seal is disposed around said tank opening and comprises an inwardly directed annular sealing lip which is canted in a generally frusto-conical shape pointing toward said seat section outlet opening and said guide means is so constructed as to impart a deflecting action to said sealing lip as said tank approaches said united position so that in the united position the entire sealing lip has been slightly deflected toward said tank opening and provides a sealing contact around said seat section opening.

9. The improvement set forth in claim 8 in which said seal has a further annular sealing lip which is canted in a generally frustoconical shape pointing toward the interior of the tank, and a flat slide valve plate is disposed between said disconnectable sealed fluid coupling and said tank for opening and closing said tank side's opening and which, when closing said opening, deflects the latter sealing lip thereby sealing to the closed valve blade.

10. The improvement set forth in claim 9 in which said coupling means includes a separable connection which automatically connects in accompaniment of motion of said tank to said united position and automatically disconnects in accompaniment of motion of said tank away from said united position.

11. The improvement set forth in claim 10 in which said separable connection of said coupling means comprises an actuating member connected to said operator and an acutated member connected to said valve blade, said actuating and actuated members, when operatively connected to each other, executing rotary motion about an axis in response to operation of said operator, and said members comprising a tongue and groove operation connection which provides for their automatic connection and disconnection by diametrical movement of one to the other relative to said axis in alignment with the direction of motion of said tank to and from said united position.

12. The improvement set forth in claim 5 in which said guide means comprises a first guide portion about said seat section opening and a second guide portion about said tank opening, said first guide portion comprising a flange which projects radially of said seat section opening and has parallel side edge portions parallel to the direction of motion of said tank to and from said united position, said second guide portion comprising side edge channels arranged parallel to the direction of said motion and fitting onto said side edge portions of said flange for securing a precise relationship in the alignment of said openings when the tank is in the united position.

13. The improvement set forth in claim 12 including a lead on said second guide portion for providing a vertical component of lead when said first guide portion initially engages said second guide portion as said tank approaches said united position and a lead on said first guide portion for initially guiding said guide portions into horizontal lateral alignment as said tank approaches said united position.

14. The improvement set forth in claim 13 in which said lead on said second guide portion comprises a flange at the leading ends of each of said side channels which is at an oblique angle to both the horizontal lateral sense and the vertical sense and said lead on said first guide portion comprises said side edge portions being curved inwardly toward each other at their leading ends.

15. The improvement set forth in claim 12 including an annular seal on said tank having an annular body which is retained on the tank around said tank opening and an annular sealing lip which projects radially inwardly from said annular body, said flange having a surface which coacts with said sealing lip as said tank approaches said united position which is effective to deflect said sealing lip so that in the united position the edge of the lip is disposed in full annular sealing engagement with said seat section opening.

16. The improvement set forth in claim 15 in which said flange surface comprises an inclined surface disposed at the leading end of said flange between the leading ends of its side edge portions, said inclined surface acting progressively circumferentially around said lip as the tank approaches said united position.

17. The improvement set forth in claim 16 in which said valve comprises a flat slide valve blade on the interior of said tank for opening and closing said tank opening, said seal having a second annular sealing lip which has a sealing engagement with respect to said flat slide valve blade when said flat slide valve blade is in closed position thereby to seal the closed slide valve blade around said tank opening.

18. The improvement set forth in claim 15 in which said sealing lip makes sealing contact with an annular portion of said first guide portion which forms a portion of said seat section outlet opening by fitting over an outlet member from the seat section.

19. The improvement set forth in claim 15 in which said second guide portion comprises means forming an annular retainer portion for retaining said seal on said tank.

20. The improvement set forth in claim 1 wherein said retention means includes a spring-loaded catch means which has an interference relationship with respect to the tank when in said united position, but which is releasable from said interference relationship to permit the tank to be moved from the united position.

21. The improvement set forth in claim 20 in which said tank passes in confrontational relationship to said spring-loaded catch means as it is being moved from the united position, said tank including clearance along the direction of its motion on said base away from the united position which permits said spring-loaded catch means to return to an interference relationship for abutment with a stop on said tank after the tank has been moved a predetermined amount from the united position thereby arresting motion of the tank before the tank has completely moved off said base.

22. The improvement set forth in claim 20 in which said tank is in a stowage compartment which is disposed adjacent a vertical sidewall of a recreational vehicle body and said tank is bodily moveable into and out of the stowage compartment via an opening in said sidewall, and including a door for closing said sidewall opening when the tank is fully within the stowage compartment.

23. The improvement set forth in claim 22 in which said tank includes a pourspout rotatably mounted on the tank for operation to a stowed position on the tank and a pourout position which points away from the tank, said pourspout being disposed on the tank adjacent the opening in said body sidewall so that said pourspout can be pointed out of said sidewall opening when the door for said sidewall is open.

24. The improvement set forth in claim 22 in which said tank comprises a top wall portion and a sidewall portion, said sidewall portion being disposed adjacent the body sidewall opening, and a pair of handles on said tank one of which is on said sidewall portion facing said opening and the other of which is on said top wall portion between said sidewall portion and said disconnectable fluid coupling.

25. The improvement set forth in claim 1 wherein said coupling means includes a separable connection which automatically connects and disconnects in accompaniment of movement of said tank to and from said united position.

26. The improvement set forth in claim 1 in which said openings when vertically aligned form a disconnectable sealed fluid coupling which is operable to provide for automatic disconnection in accompaniment of bodily movement of said tank from said united position and for automatic sealed connection in accompaniment of bodily movement of said tank toward said united position.

27. The improvement set forth in claim 1 in which said openings when vertically aligned form a disconnectable sealed fluid coupling and said valve is a horizontal slide valve blade for opening and closing the opening on the tank, and means for mounting said slide valve blade on said tank for arcuate motion about an axis to open and close said tank opening, said valve blade having a shape which is non-circular but includes an arcuate edge portion which is concentric with said axis, and track structure for supporting said blade comprising a first arcuate track portion for supporting said arcuate edge portion of said valve blade as said valve blade moves accurately between open and closed positions, and a second arcuate track portion for supporting said blade along an arc concentric with said first track portion at a smaller radius than said first track portion.

28. The improvement set forth in claim 27 in which said blade and track structure are disposed within said tank.

29. The improvement set forth in claim 28 including an annular seal disposed on said holding tank around said tank opening, and means on said blade and said track portions for causing said blade to be displaced bodily toward said annular seal in response to arcuate motion of the blade about said axis in the closing direction such that in the closed position of the blade, the blade is disposed at a higher elevation than when the blade is disposed in open position.

30. The improvement set forth in claim 29 in which said means on said track portions and blade for elevating the blade comprises ramp means arranged at two locations on each of said track portions, said ramp means having differing slopes and lengths correlated with their radial distances from said axis.

31. The improvement set forth in claim 30 in which a ramp is provided on the leading edge of said blade which spans those portions of the blade which are engaged by said arcuate track portions.

32. The improvement set forth in claim 28 in which said arcuate track portions are part of an arcuate track member disposed inside of the holding tank for capturing the blade relative to the top wall of the holding tank.

33. The improvement set forth in claim 32 in which said coupling means comprises an actuating member and an actuated member which are concentric with said axis but which are disconnectable from each other in a diametrical sense relative to said axis of actuation.

34. The improvement set forth in claim 33 in which said operator is disposed on said seat section and in which said actuating member and said actuated member connect and disconnect from each other in accompaniment of motion of said tank toward and away from said united position.

35. The improvement set forth in claim 34 including an annular seal about said tank opening, said seal sealing against said seat section outlet opening when said tank is in said united position.

36. The improvement set forth in claim 35 in which said seal comprises a pair of sealing lips which diverge away from each other as they project radially inwardly of the seal, one of said sealing lips projecting into sealing engagement with the outlet opening of the seat section and the other of the sealing lips projecting for sealing with the slide valve blade when the slide valve blade is in position closing said tank opening.

37. The improvement set forth in claim 35 including a pair of handles on said tank top wall disposed respectively on opposite sides of a vertical plane bisecting the tank.

38. The improvement set forth in claim 37 further including a pourspout rotatably mounted in an aperture on the holding tank top wall for operation between a stowed position overlying the tank and a pourout position in which the spout points away from the tank, and a vent valve assembly mounted in another aperture of the holding tank top wall for venting of the tank's headspace when the waste contents of the tank are emptied via the pourspout, said apertures being on opposite sides of said vertical plane.

* * * * *